(12) United States Patent
Park et al.

(10) Patent No.: US 8,043,150 B2
(45) Date of Patent: Oct. 25, 2011

(54) GAME SYSTEM AND METHOD USING TWIN GAGE

(75) Inventors: Hyun-Woo Park, Seoul (KR); In-Ho Kang, Seoul (KR)

(73) Assignee: NHN Corporation, Seongnam-si (KR)

( * ) Notice: Subject to any disclaimer, the term of this patent is extended or adjusted under 35 U.S.C. 154(b) by 785 days.

(21) Appl. No.: 11/570,967

(22) PCT Filed: Jun. 22, 2005

(86) PCT No.: PCT/KR2005/001933
§ 371 (c)(1),
(2), (4) Date: Dec. 19, 2006

(87) PCT Pub. No.: WO2006/001631
PCT Pub. Date: Jan. 5, 2006

(65) Prior Publication Data
US 2008/0287174 A1    Nov. 20, 2008

(30) Foreign Application Priority Data
Jun. 25, 2004    (KR) .......................... 10-2004-0048260

(51) Int. Cl.
*A63F 9/24* (2006.01)
(52) U.S. Cl. ................................... 463/3; 463/7; 463/31
(58) Field of Classification Search ........... 463/3, 30–40
See application file for complete search history.

(56) References Cited

U.S. PATENT DOCUMENTS

| 6,217,444 | B1 * | 4/2001 | Kataoka et al. | 463/3 |
| 6,394,896 | B2 * | 5/2002 | Sugimoto | 463/3 |
| 6,626,756 | B2 * | 9/2003 | Sugimoto | 463/4 |
| 2001/0011035 | A1 * | 8/2001 | Sugimoto | 463/3 |
| 2002/0177477 | A1 * | 11/2002 | Okitsu et al. | 463/3 |
| 2004/0176165 | A1 * | 9/2004 | Takahashi et al. | 463/36 |
| 2004/0180709 | A1 * | 9/2004 | Takahashi et al. | 463/3 |
| 2004/0214623 | A1 * | 10/2004 | Takahashi et al. | 463/2 |

FOREIGN PATENT DOCUMENTS

| JP | 2001-190836 A | 7/2001 |
| JP | 2002-052245 A | 2/2002 |
| JP | 2002-320776 A | 11/2002 |

(Continued)

OTHER PUBLICATIONS

"Everybody's online GOLF manual", SCPS15049, Sony Computer Entertainment Inc., Dec. 25, 2003, p. 19-21 English translation of abstract.

(Continued)

*Primary Examiner* — Peter DungBa Vo
*Assistant Examiner* — Steve Rowland
(74) *Attorney, Agent, or Firm* — H.C. Park & Associates, PLC

(57) ABSTRACT

Disclosed is a game system and method using a twin gage. In the game method, a twin gage for performing the ball game is provided to a user. The twin gage includes first and second swing gages arranged on the basis of an impact zone for determining a movement direction of the ball, and movable first and second scroll bars are formed on the first and second swing gages, respectively. A batting point of the ball according to the batting intention of the user is determined, and then a position of the impact zone of the twin gage is varied according to the determined batting point. Then, when the user manipulates the twin gage, the ball is moved in a movement direction of the ball determined according to a positional relation between the first and second scroll bars, which move and then stop according to the manipulation of the twin gage, and the impact zone. With such a configuration, a degree of difficulty of manipulation of a swing is varied according to the batting intention of the user, thereby making ball games more interesting.

22 Claims, 15 Drawing Sheets

FOREIGN PATENT DOCUMENTS

| | | |
|---|---|---|
| JP | 2003-071131 A | 3/2003 |
| JP | 2003-093736 A | 4/2003 |
| JP | 2003-154164 A | 5/2003 |
| KR | 10-2003-0079315 A | 10/2003 |

OTHER PUBLICATIONS

"Everybody's online GOLF 4 manual", SCPS15059, Sony Computer Entertainment Inc., Dec. 25, 2003 English translation of abstract.

"Playstation vol. 9, Issue No. 32 (Everybody's golf)" p. 130-133, MediaWorks Inc., Dec. 12, 2003 English translation of abstract.

"Playstation vol. 9, Issue No. 29 (Everybody's golf)" p. 240-205, MediaWorks Inc., Dec. 14, 2003.

"Playstation BB vol. 9, Issue No. 21 Playstation 9/5 Extra Edition (Everybody's golf)" p. 20-29, MediaWorks Inc., Sep. 5, 2003 English translation of abstract.

\* cited by examiner

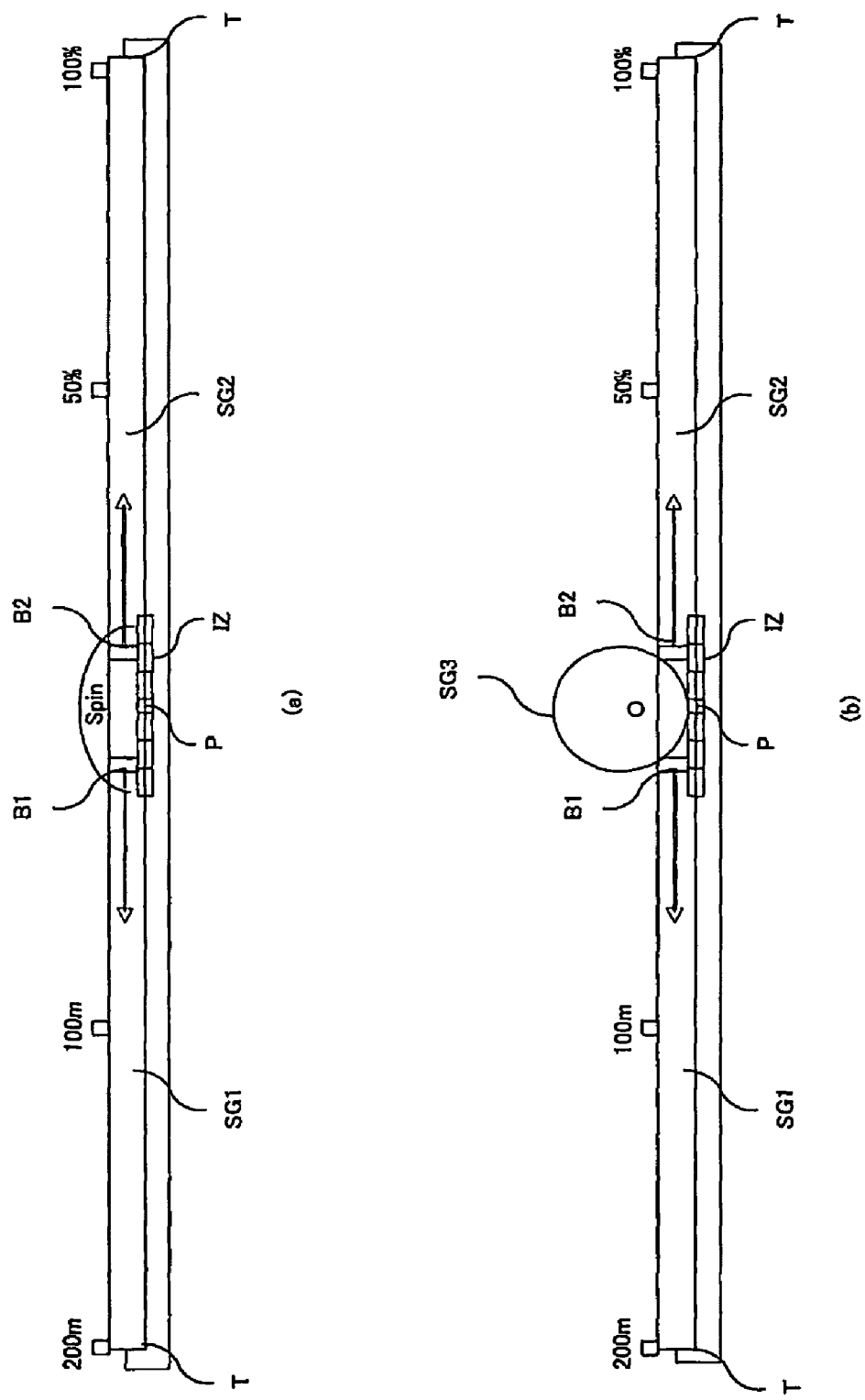
[Fig.1]

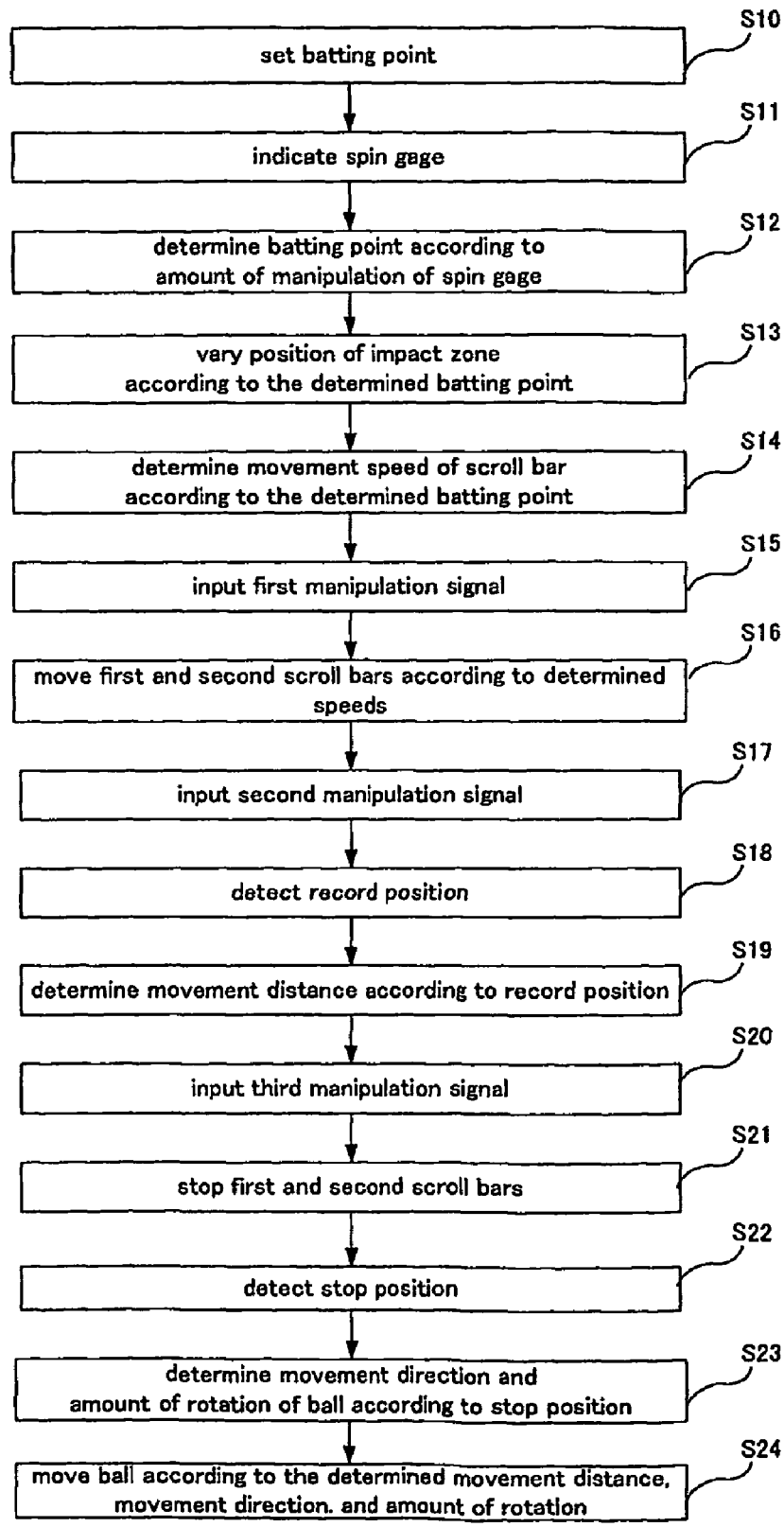

[Fig.3]
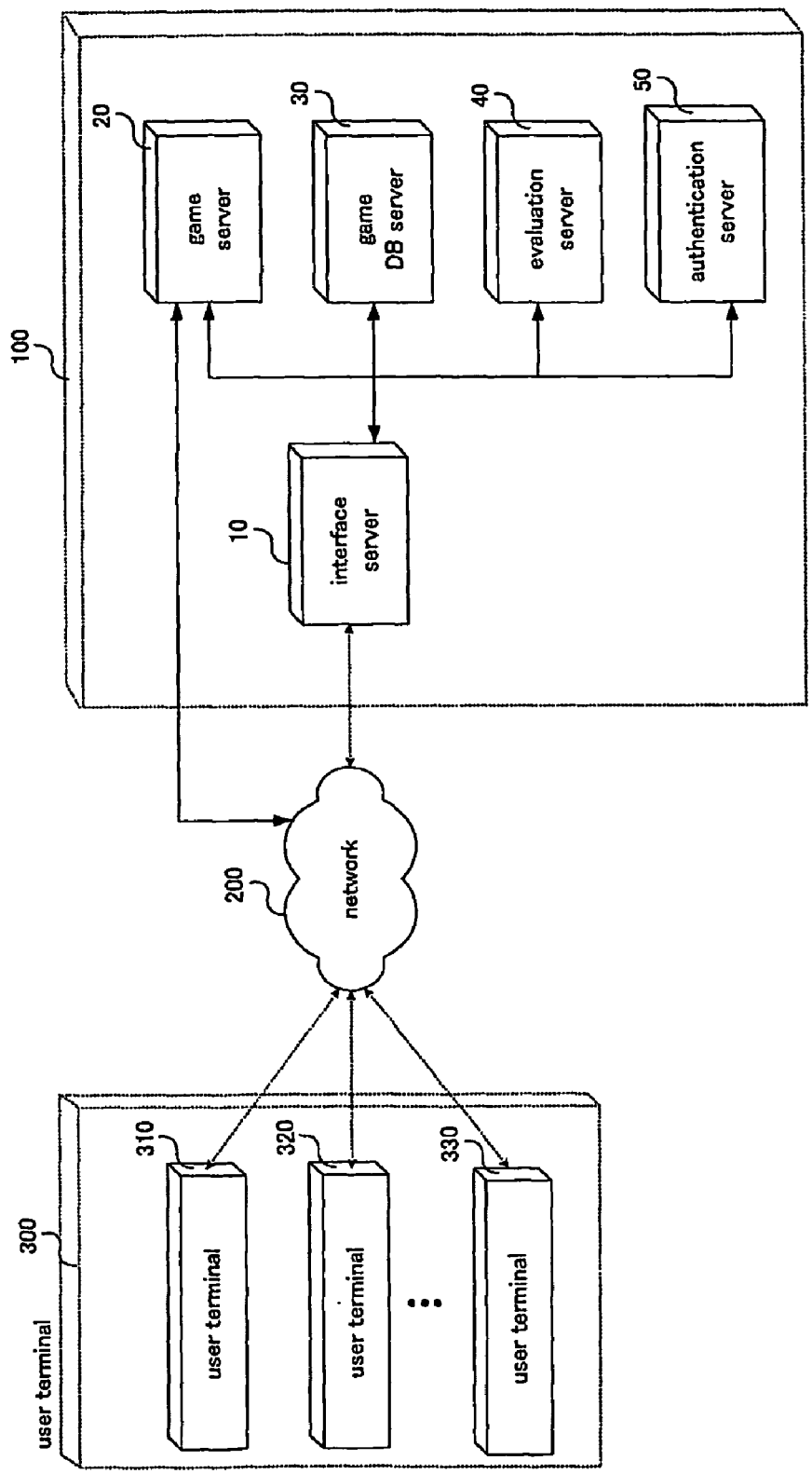

[Fig.4]
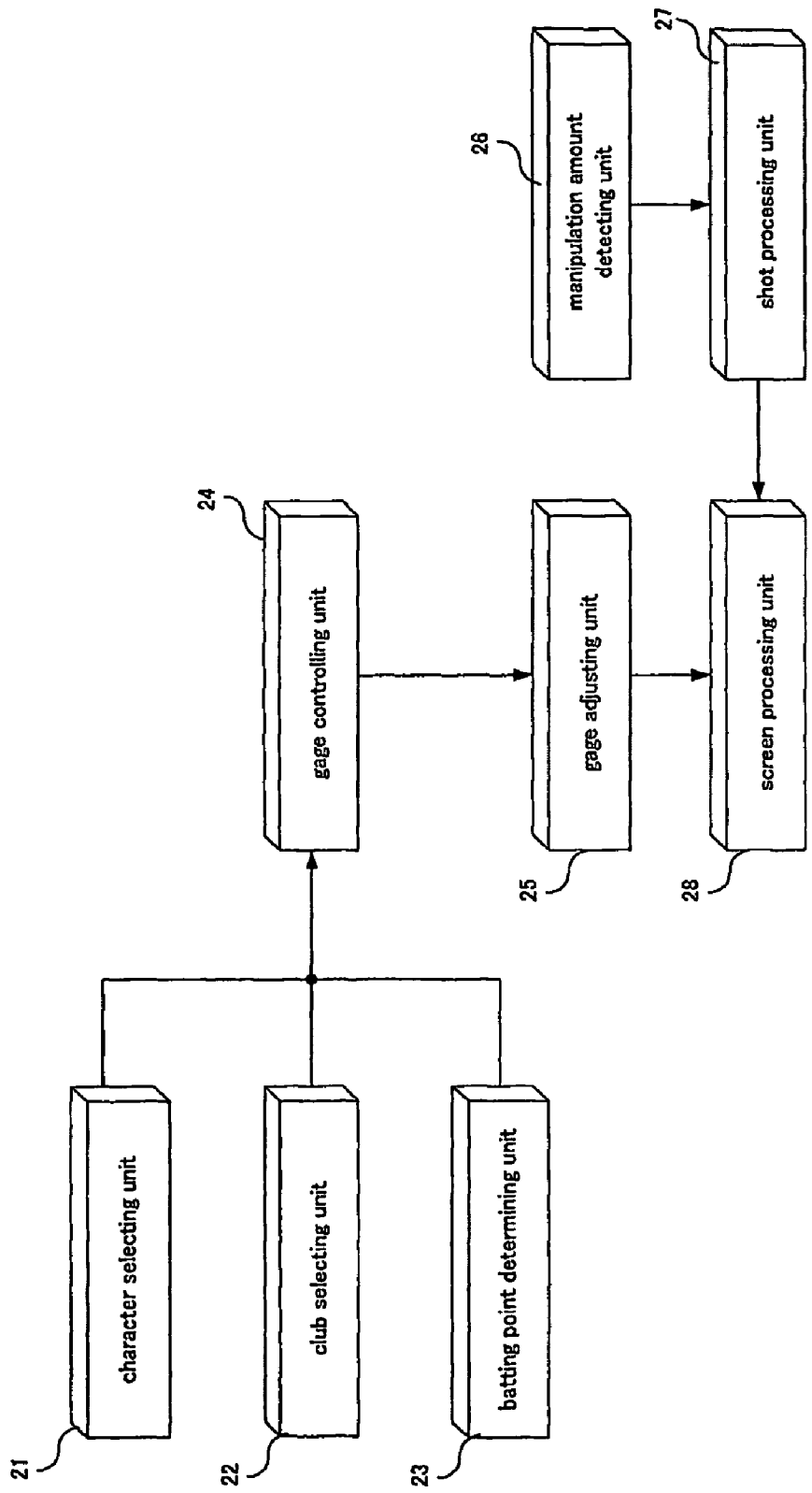

[Fig.5]
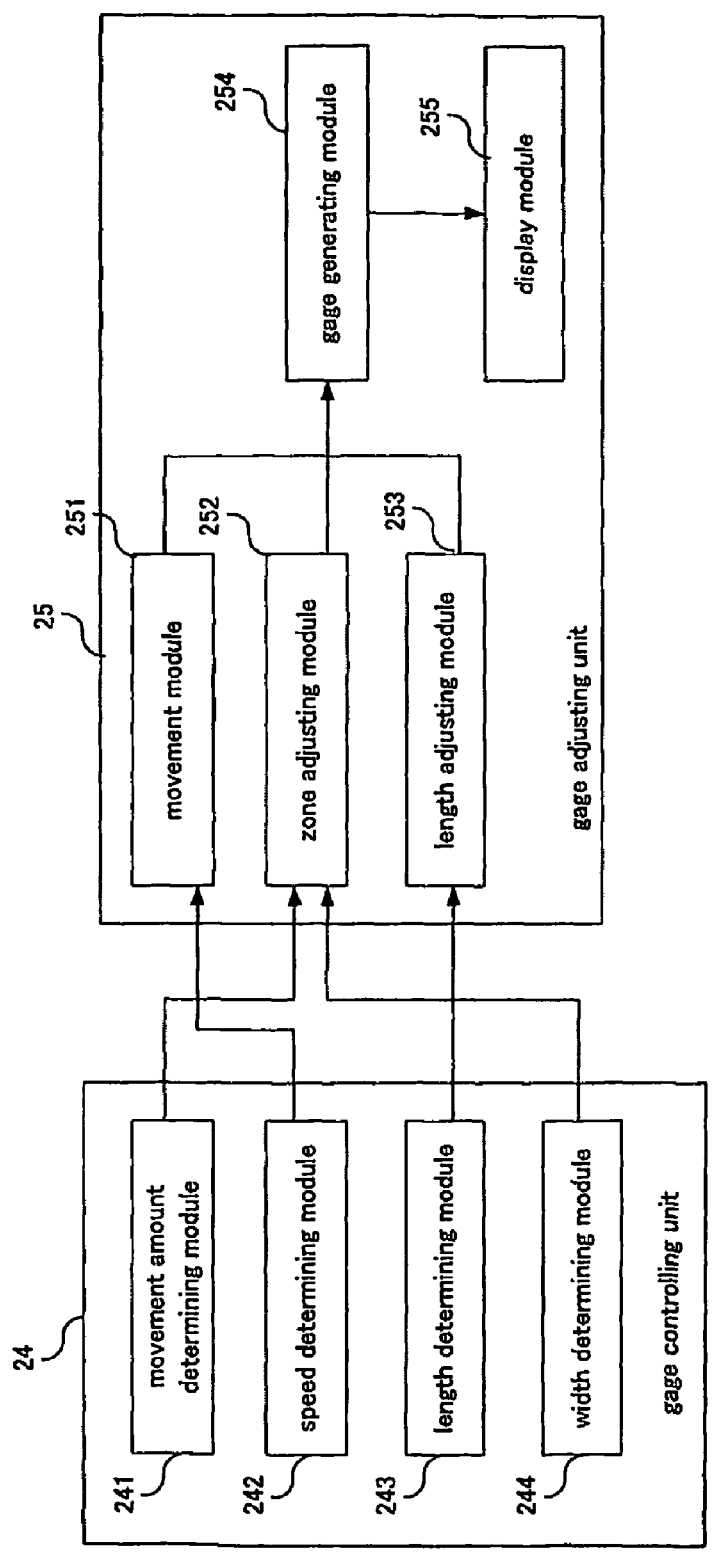

[Fig.6]
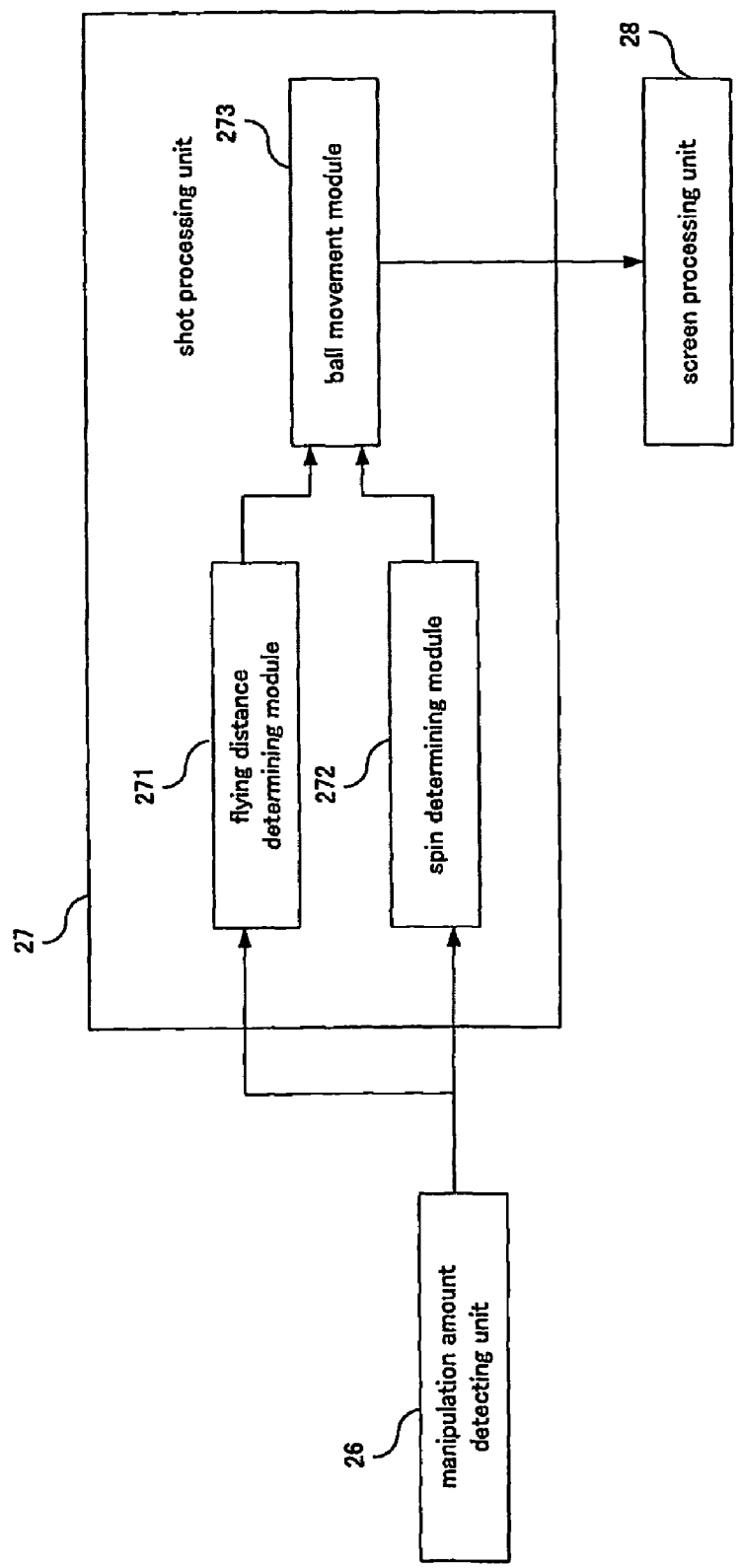

[Fig.7]
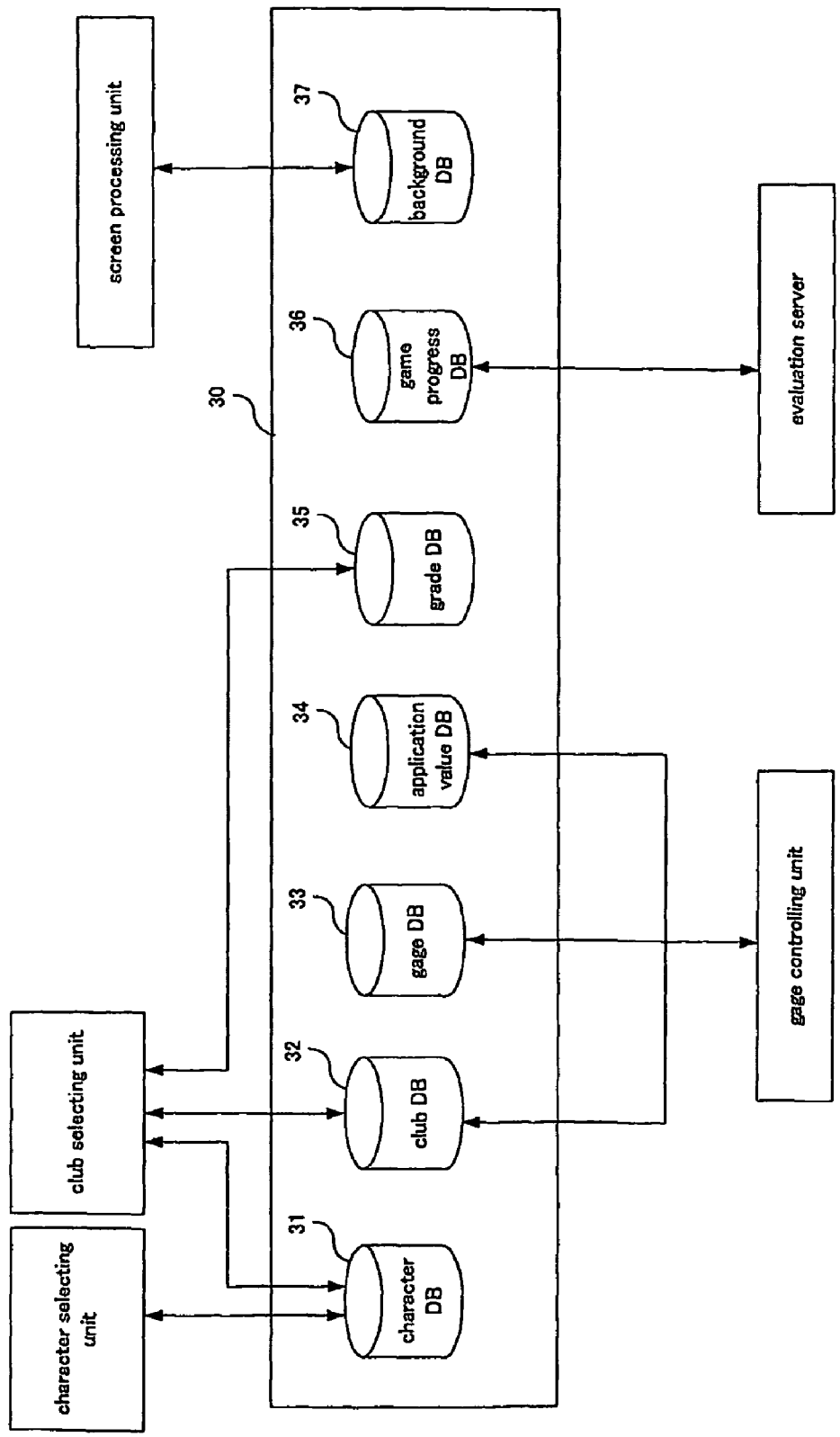

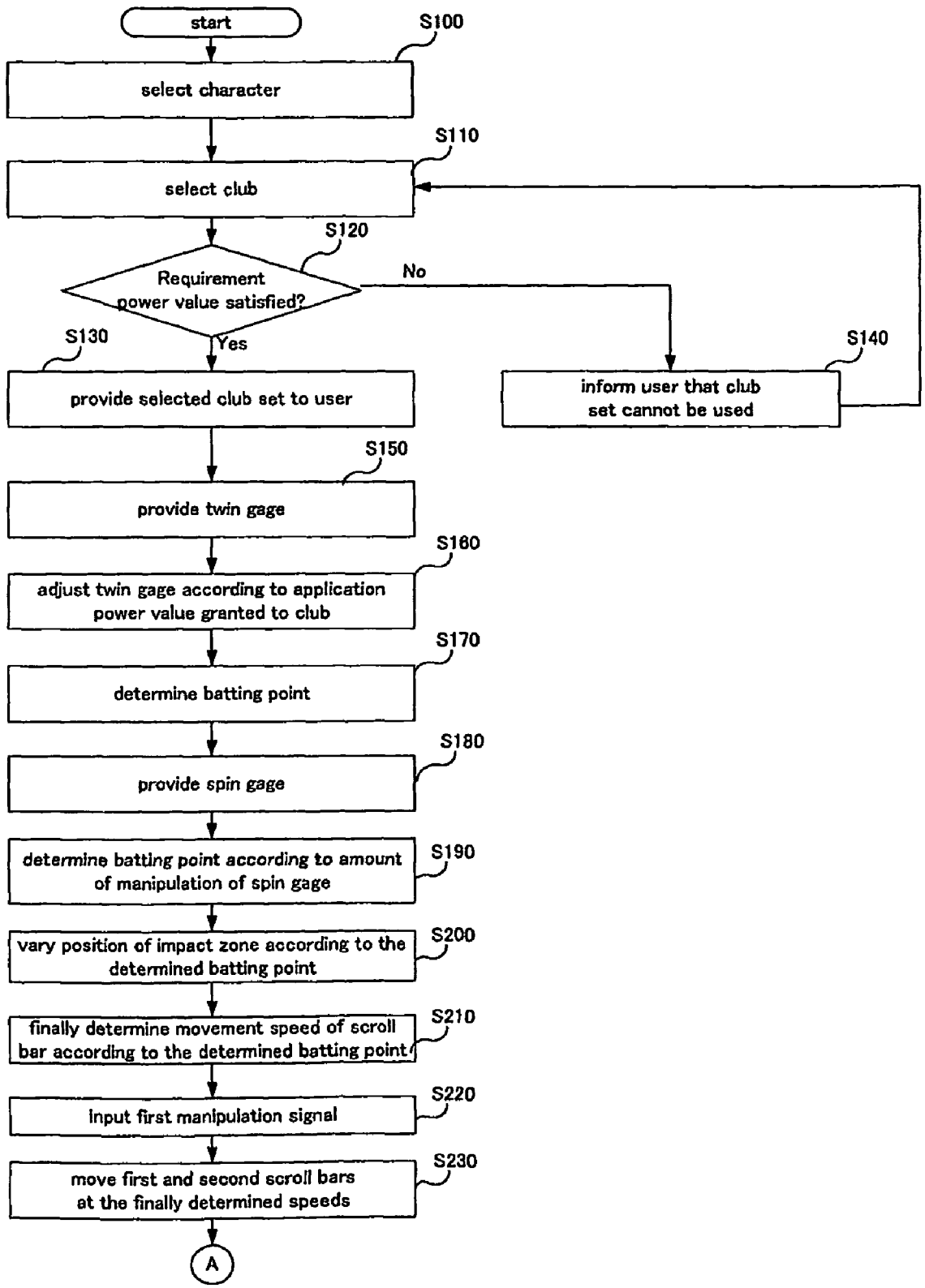
[Fig.8]

[Fig.9]
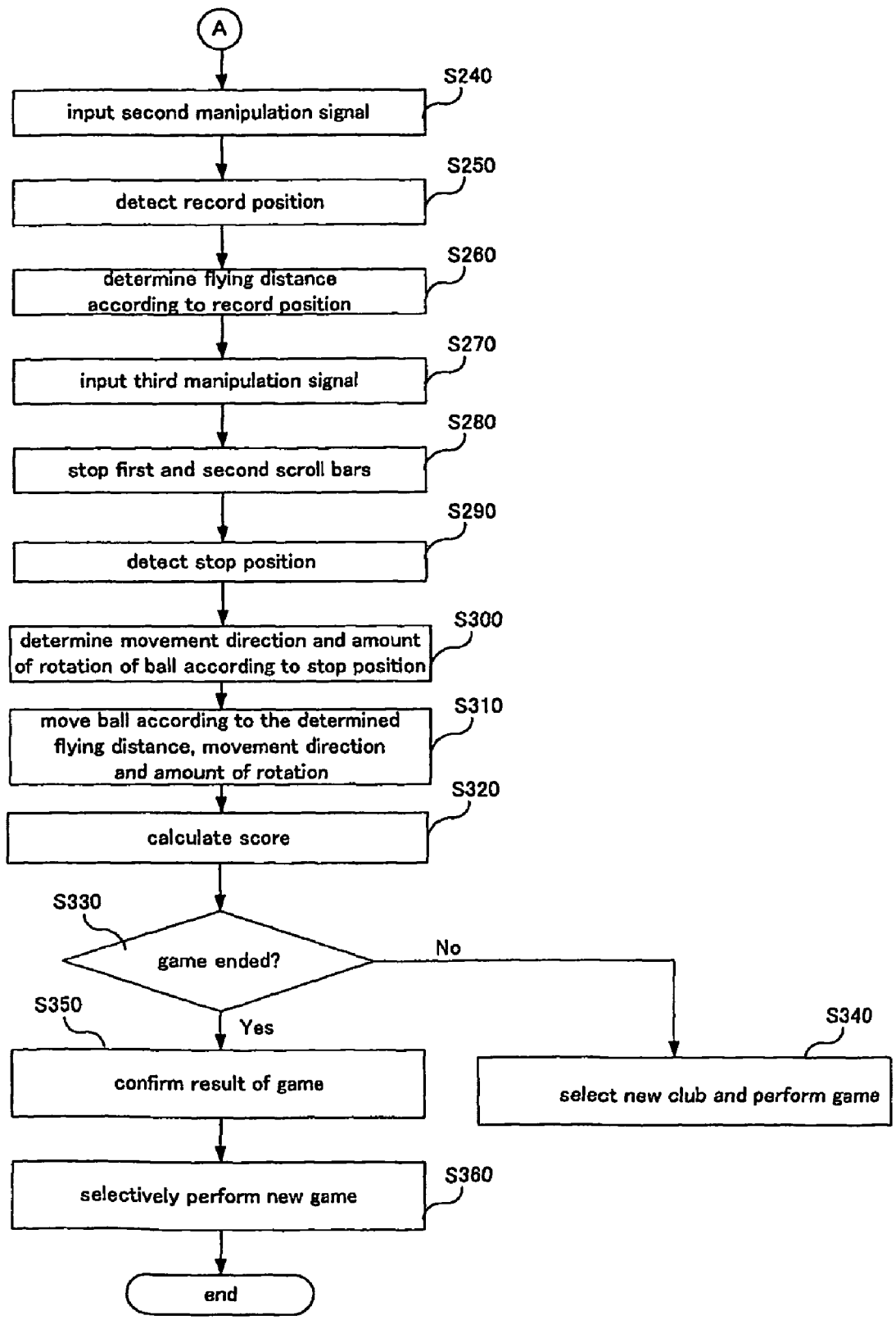

[Fig.10]
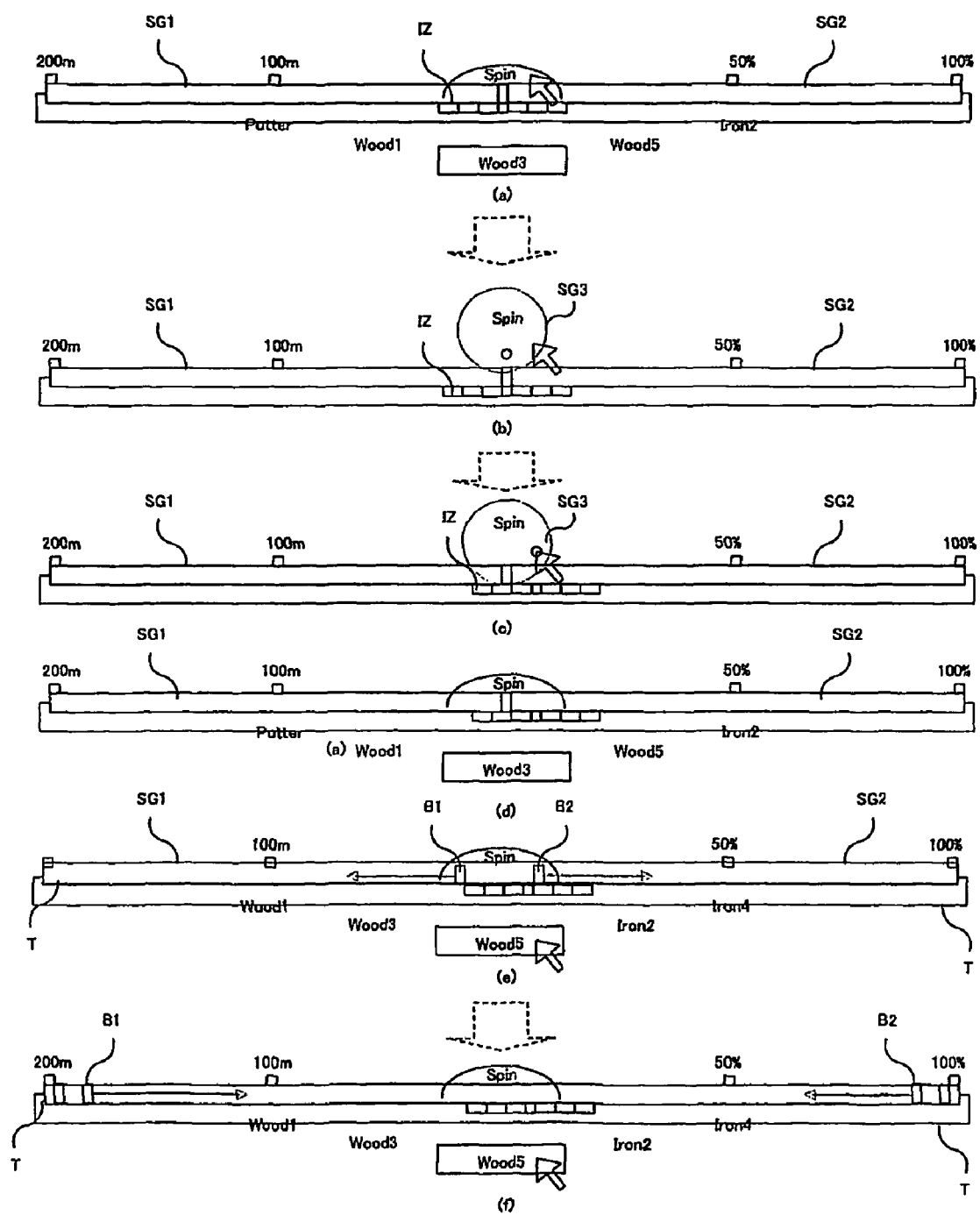

[Fig.11]
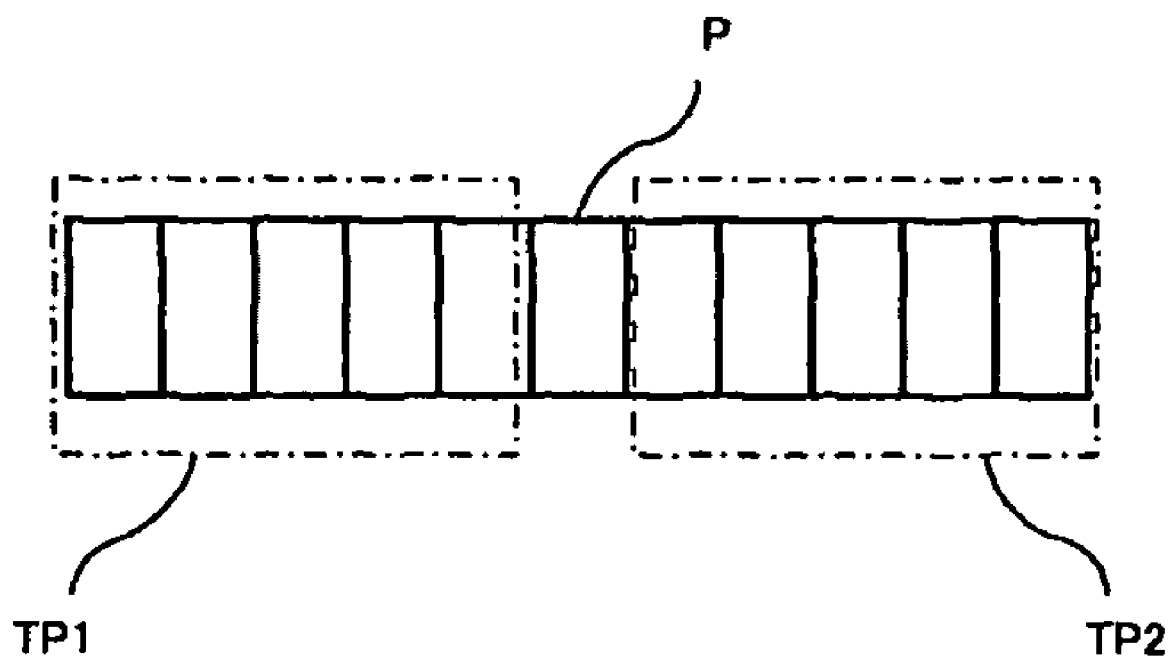

[Fig.12]
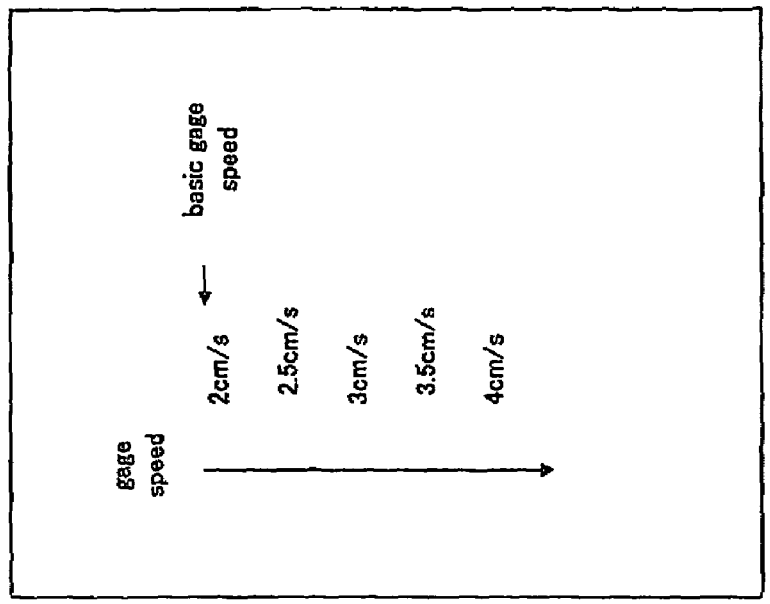
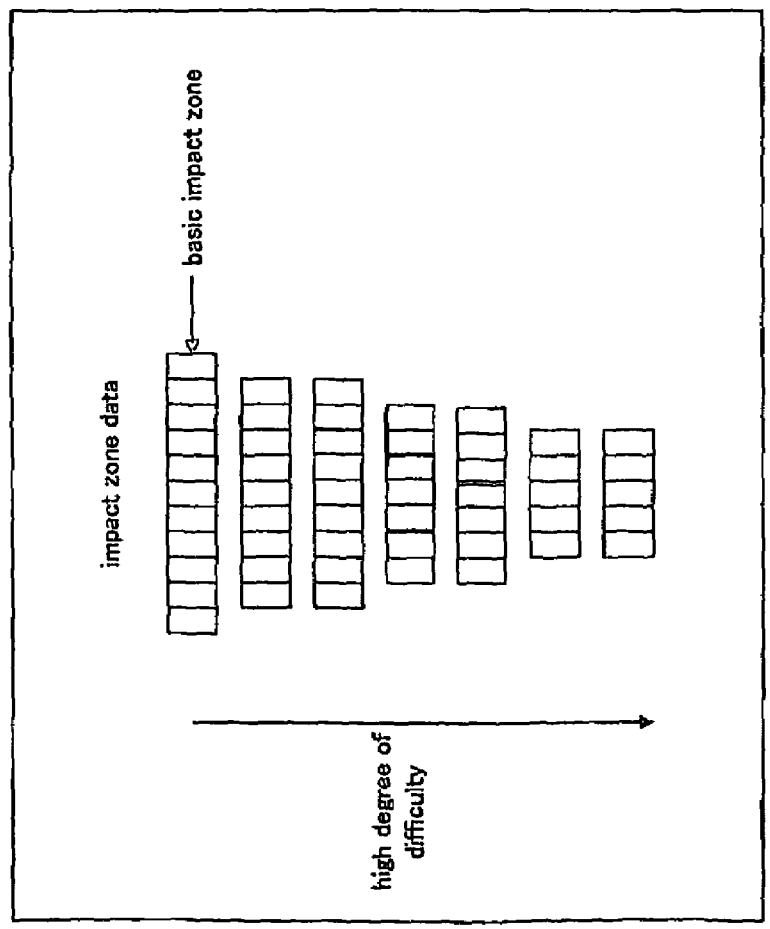

[Fig.13]
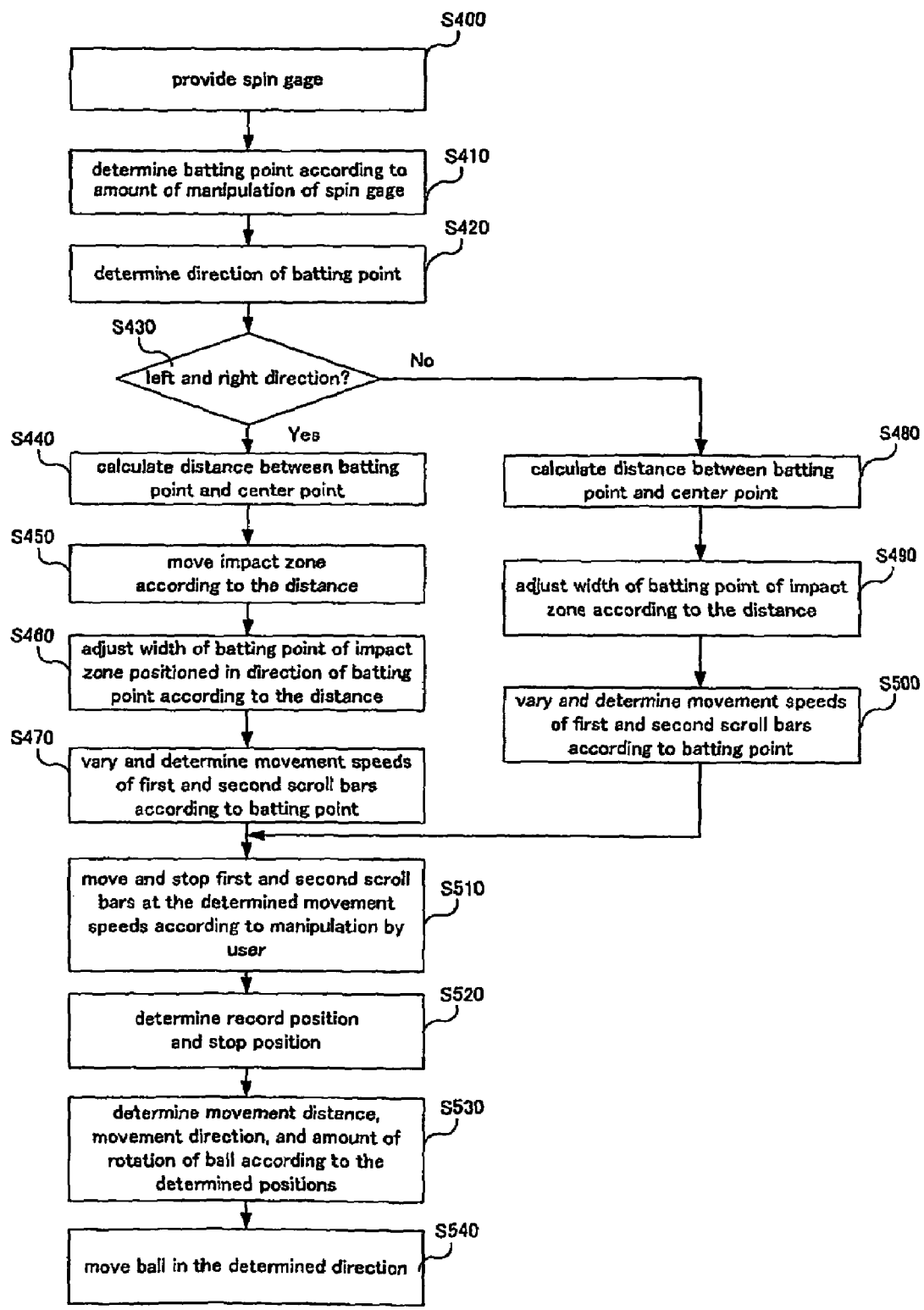

[Fig. 14]
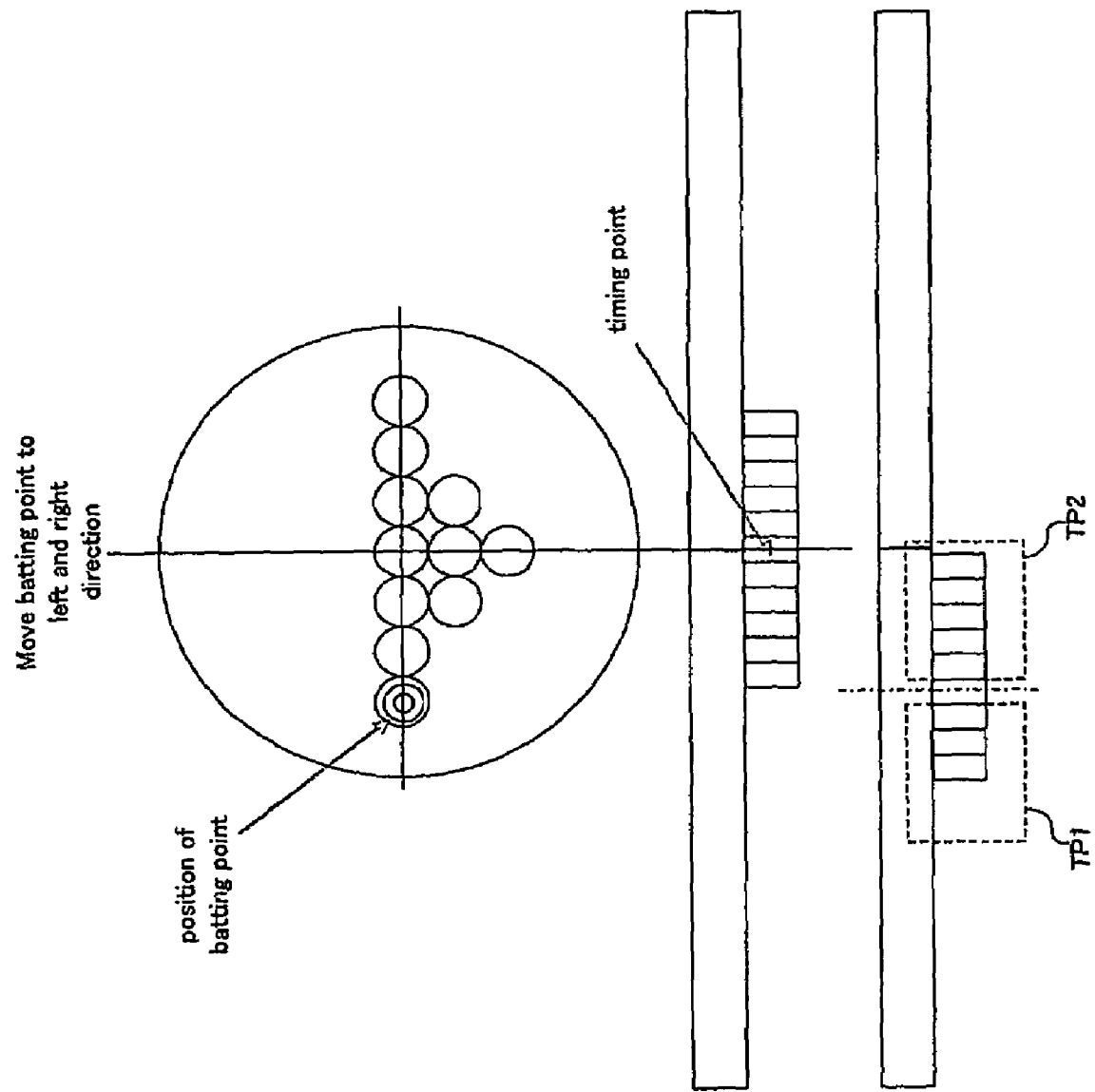

[Fig.15]
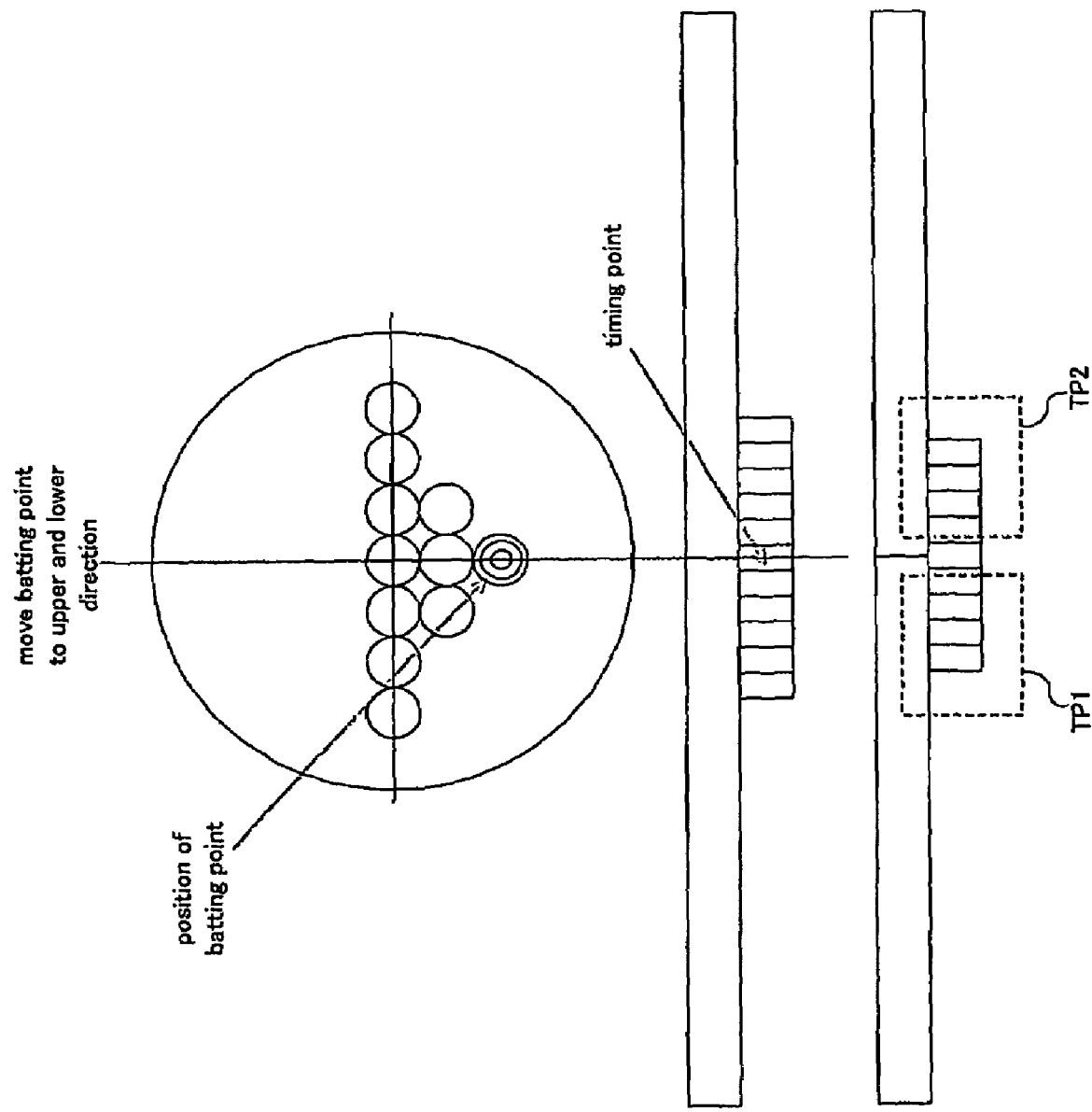

GAME SYSTEM AND METHOD USING TWIN GAGE

CROSS REFERENCE TO RELATED APPLICATIONS

This application is a U.S. National Phase Application of International Application PCT Application No. PCT/KR2005/001933 filed on Jun. 22, 2005, which claims the benefit of priority from Korean Patent Application No. 10-2004-0048260 filed on Jun. 25, 2004. The disclosures of International Application PCT Application No. PCT/KR2005/001933 and Korean Patent Application No. 10-2004-0048260 are incorporated herein by reference.

TECHNICAL FIELD

This invention relates to a game system and method, and more particularly to a game system and method using a twin gage.

BACKGROUND ART

With the development and spread of communication networks and the rapid increase in the Internet population, a variety of web contents, including electronic commerce, portals, games, and the like, have been provided to go with the growth of the Internet.

On-line games through the Internet, which are daily populated by young boys and girls, include arcade games, role-playing games, strategic simulation games, shooting games, sports games such as car racing and golf, adventure games, and the like.

Among these games, particularly in games using balls, such as a golf game, a baseball game, a volleyball game, a billiard game, and the like, a swing control means for moving a ball to a direction and position desired by a user has been used. Hereinafter, the swing control means is called a swing gage for the sake of convenience of explanation. Here, "swing" refers to an act for moving balls in games using balls, such as a shot in a golf game.

The swing gage may be configured in various forms. For example, the swing gage generally includes a zone for determining a direction of movement or an amount of rotation of a ball and a scroll bar for moving or stopping a movement guide for guiding movement of the ball to the zone according to manipulation by a user.

When a user swings the ball using the swing gage having the above structure in the ball game, the scroll bar begins to move along the movement guide according to a first manipulation by the user, and then, the moving scroll bar stops according to a second manipulation by the user. A movement direction (and/or an amount of rotation) of the ball is determined according to a positional relationship between a stop position of the scroll bar and the zone and a swing by which the ball is moved in the determined movement direction. In this case, a movement distance of the ball is determined according to a condition of movement of the scroll bar and the ball is moved by the determined movement distance in the determined movement direction in the swing.

However, when a ball game, such as golf, baseball, or the like, is played using the swing gage operating as described above, since there is no difference in manipulation of the swing gage between a swing having a high degree of difficulty and a swing having a low degree of difficulty, there is a disadvantage in that the ball game is less interesting.

For example, in an actual off-line golf game, to spin the ball is even more difficult than not to spin the ball. However, conventionally, under a condition where a position of the zone of the swing gage is always fixed, the ball is selectively spun only by requiring the user to place the scroll bar on the zone.

In this manner, conventionally, since manipulation of the swing gage is conducted under the same conditions in both a case that the ball is spun and a case that the ball is not spun, there is a disadvantage in that operation of the ball game is too easy, and accordingly, the ball game is less interesting.

DISCLOSURE

Technical Problem

In order to overcome the above-mentioned disadvantages, it is an object of the present invention to make a game more interesting by varying conditions of swing gages according to a batting intention of a user in a game system using a ball.

It is another object of the present invention to provide diversity of manipulation of swing gages by constructing two swing gages in the form of a twin and varying a position of an impact zone placed between the two swing gages according to the batting intention of a user.

It is yet another object of the present invention to easily set a batting point of a ball according to the batting intention of a user.

Technical Solution

To achieve the above objects, according to one aspect, the present invention provides a method of playing a game using a ball, the method comprising the steps of: a) providing a twin gage to a user for performing the ball game, wherein the twin gage includes first and second swing gages arranged on the basis of an impact zone for determining a movement direction and an amount of rotation of the ball, and first and second scroll bars movable on the first and second swing gages, respectively; b) determining a batting point of the ball according to the batting intention of the user; c) varying a position of the impact zone of the twin gage according to the determined batting point; and d) when the user manipulates the twin gage, moving the ball in a movement direction and with an amount of rotation of the ball, wherein the movement direction and the amount of rotation of the ball are determined according to a positional relation between the first and second scroll bars, which move and then stop according to the manipulation of the twin gage, and the impact zone.

According to another aspect, the present invention provides a method of playing a ball game using a ball, the method comprising the steps of: a) providing a twin gage to a user for performing the ball game, wherein the twin gage includes first and second swing gages arranged on the basis of an impact zone for determining a movement direction and an amount of rotation of the ball, and first and second scroll bars movable on the first and second swing gages, respectively, the impact zone including a timing point for a best swing and first and second batting points, which are arranged on the basis of the timing point; b) determining a batting point of the ball according to the batting intention of the user; c) determining a direction in which the determined batting point is positioned from a center point of the ball and a distance between the center point and the batting point; d) selectively varying widths of the first and second batting points of the impact zone of the twin gage according to the determined direction and distance; and e) when the user manipulates the twin gage, moving the ball in a movement direction and with an amount of rotation of the ball, wherein the movement direction and the amount of rotation of the ball are determined according to a positional relation between the first and second scroll bars, which move and then stop according to the manipulation of the twin gage, and the impact zone.

According to yet another aspect, the present invention provides a method of playing a game using a ball, the method comprising the steps of: a) providing swing control means to a user for performing the ball game; b) providing a spin gage for determining a batting point of the ball, the batting point being marked on the spin gage; c) when the user moves the batting point of the spin gage to a specified position, determining the specified position as a batting point for a swing; and d) when the user manipulates the swing control means, moving the ball in a direction according to the determined batting point.

According to yet another aspect, the present invention provides a system for playing a game using a ball, comprising: a gage adjusting unit for providing a twin gage to a user for performing the ball game, wherein the twin gage includes first and second swing gages arranged on the basis of an impact zone for determining a batting direction of the ball, and first and second scroll bars movable on the first and second swing gages, respectively; a batting point detecting unit for detecting a batting point of the ball according to the batting intention of the user, a gage controlling unit for determining a position of the impact zone of the twin gage and movement speeds of the first and second scroll bars according to the detected batting point; and a shot processing unit for moving the ball in a movement direction and with an amount of rotation of the ball, wherein the movement direction and the amount of rotation of the ball are determined according to a positional relation between the first and second scroll bars, which move and then stop according to the manipulation of the twin gage, and the impact zone.

DESCRIPTION OF DRAWINGS

FIG. 1 is a structural view of a twin gage according to an embodiment of the present invention.

FIG. 2 is a flow chart of a game method using a twin gage according to an embodiment of the present invention.

FIG. 3 is a structural view of a game system using a twin gage according to an embodiment of the present invention.

FIG. 4 is a detailed structural view of a game server shown in FIG. 3.

FIGS. 5 and 6 are detailed structural views of components constituting the game server shown in FIG. 4.

FIG. 7 is a detailed structural view of a game database shown in FIG. 3.

FIGS. 8 and 9 are flow charts of a game method when a twin gage according to an embodiment of the present invention is applied to a golf game.

FIG. 10 is an exemplary view showing movement of a twin gage varied when a batting point is determined and a shot process is performed according to an embodiment of the present invention.

FIG. 11 is a detailed structural view of an impact zone according to an embodiment of the present invention.

FIG. 12 is an exemplary view showing a width control phase of an impact zone according to another embodiment of the present invention.

FIG. 13 is a flow chart of a game method using a twin gage according to another embodiment of the present invention.

FIGS. 14 and 15 are views illustrating an example to which the game method shown in FIG. 13 is applied.

MODE FOR INVENTION

Hereinafter, the most preferable embodiments through which those skilled in the art can practice the present invention will be described in detail with reference to the accompanying drawings. However, it should be understood that the present invention can be implemented in various ways without limiting to the embodiments.

A game system according to an embodiment of the present invention forms a swing gage for setting batting variables in the form of a twin gage in order to make a game using balls more interesting. Here, the batting variables are variables for determining movement of a ball when the ball is batted, including a movement distance of the ball, a movement direction (or batting direction) of the ball, an amount of rotation of the ball, and the like, without limiting to these variables.

The swing gage, by use of which a user can control these batting variables, includes an impact zone and a first swing gage and a second swing gage arranged on the basis of the impact zone. The swing gage according to the embodiment of the present invention is hereinafter called a "twin gage" since it includes two gages.

FIG. 1 shows a structure of a twin gage according to an embodiment of the present invention.

As shown in (a) of FIG. 1, in the embodiment of the present invention, an elongated bar-like swing gage is divided into a first swing gage SG1 and a second swing gage SG2 on the basis of an impact zone IZ.

The impact zone IZ has a short bar-like form and includes a timing point P from which a best shot is attained near its center. The timing point P is a point at which the best shot, which is most appropriate for a batting point intended by a user, is attained. In the remaining regions of the impact zone IZ except the timing point P, an ordinary shot where a ball is batted to regions around the batting point intended by the user is attained. The impact zone IZ is placed at an initial position at which the timing point P is correspondingly arranged at the center of the twin gage.

On the other hand, movable scroll bars are formed on the first swing gage SG1 and the second swing gage SG2, respectively. For the purpose of explanation, a scroll bar moving in the first swing gage SG1 is called a first scroll bar B1 and a scroll bar moving in the second swing gage SG2 is called a second scroll bar B2.

The first and second scroll bars B1 and B2 are initially placed at a start position (for example, the timing point P), and move to a turning point T on the respective swing gages and then turn in the opposite direction according to a manipulation of the user. Also, in a condition where the scroll bars are moving, the scroll bars are stopped at a certain position according to another manipulation of the user and then are swung depending on a positional relation between the stop position and the impact zone IZ. For example, a best shot is attained when the first scroll bar B1 and the second scroll bar B2 are stopped at the timing point P of the impact zone IZ, an ordinary shot is attained when the first and second scroll bars B1 and B2 are stopped at positions in the impact zone IZ other than the timing point P, and a mishit shot is attained when the first and second scroll bars B1 and B2 are stopped at positions deviated from the impact zone IZ.

Particularly, in the embodiment of the present invention, according to a batting intention of the user, a position of the impact zone IZ and movement speeds of the first scroll bar B1 and the second scroll bar B2 are varied. That is, according to a batting intention of the user, the position of the impact zone IZ is changed so that a manipulation of the twin gage is performed according to a degree of difficulty, and the speeds of the first and second scroll bars B1 and B2 are varied according to such a change in the position of the impact zone IZ.

In the embodiment of the present invention, in order to detect the batting intention of the user, as shown in (b) of FIG. 1, in addition to the twin gage, a spin gage SG3 through which the user can easily set a batting point is provided. The spin gage SG3 may be configured in a ball-like shape so that the user can have the sense of actual batting. A batting point movable depending on a manipulation by the user is marked on the spin gage SG3, so that the user can easily set the batting point. For example, the user can move the batting point marked on the spin gage SG3 in a direction and position desired by the user by dragging the batting point using a mouse, or the like. However, a method of setting the batting point according to the present invention is not limited to the method using a spin gage and the shape of the spin gage is also not limited to a ball.

Based on the batting point set according to the manipulation of the spin gage SG3, a position of the impact zone IZ according to the embodiment of the present invention is varied. Accordingly, the user can surely know where a batting point intended by the user is at the sight of the varied position of the impact zone IZ on the twin gage.

On the other hand, when the position of the impact zone IZ is varied by the batting point set as the batting intention of the user, lengths of the first swing gage SG1 and the second swing gage SG2, which are divided by the impact zone, are varied. Accordingly, if the first and second scroll bars B1 and B2 move at the same speed, time taken for the first and second scroll bars B1 and B2 to arrive at the timing point P become different. Accordingly, a shot of the user cannot be decided in the same way as when the impact zone IZ is placed at the initial position. Accordingly, in the embodiment of the present invention, irrespective of a position of the impact zone IZ, the time taken for the first and second scroll bars B1 and B2 to make a round trip to the first and second swing gages SG1 and SG2, respectively (that is, the time taken for each scroll bar to make a round trip between its starting position and its turning point) becomes equal, and movement speeds of the first and second scroll bars B1 and B2 are varied depending on the time. Particularly, a speed of a scroll bar moving on a swing gage positioned in a direction in which the impact zone IZ is moved is decreased, whereas a speed of the other scroll bar moving on the other swing gage positioned in a direction opposite to the direction of movement of the impact zone is increased. In this case, the first and second scroll bars B1 and B2 may be moved in the same speed from their start positions to their turning points T, and, on the contrary, may be varied in their speeds from the turning points T to the starting positions or starting from prescribed positions, as described above. Accordingly, even when the position of the impact zone is varied, the first and second scroll bars B1 and B2 can be stopped at the same position in the impact zone IZ depending on a manipulation of the user.

As described above, as the position of the impact zone is varied depending on the batting intention of the user, and the speeds of the first and second scroll bars B1 and B2 moving on the first and second swing gages, respectively, arranged on the basis of the impact zone, are varied, it becomes more difficult for the user to perform a manipulation for a best shot if the user desires to spin a ball. This gives an effect of making a ball game more interesting.

On the other hand, information on a movement distance of a ball depending on positions of the scroll bars B1 and B2 moving on the first and second swing gages SG1 and SG2 can be indicated on the first and second swing gages SG1 and SG2. In this case, the information indicated on the first and second swing gages SG1 and SG2 can be indicated in the form of a different unit. For example, distance information in the form of a distance (for example, an absolute distance) actually applied when the user swings a scroll bar is indicated on the first swing gage SG1, while distance information in the form of % (for example, a relative distance) to which the maximum movement distance is applied is indicated on the second swing gage SG2. As shown in FIG. 1, an actual distance, such as "100 M" and "200 M", is indicated on the first swing gage SG1, while the distance information in the form of % to which the maximum movement distance is applied, such as "50%" and "100%", is indicated on the second swing gage SG2. At this time, if the movement distance is different for each swing control means, such as a club or bat used by the user, the distance information indicated on the first swing gage SG1 may be varied. However, different indications of the distance information on the first and second swing gages SG1 and SG2 may be optional.

Now, a method of determining a movement distance, a movement direction, and an amount of rotation of a ball using the twin gage having the above-described characteristics will be described.

FIG. 2 shows a game method through a manipulation of a twin gage according to an embodiment of the present invention.

As shown in FIG. 2, when a user is to swing in a game using a ball, he first sets a batting point according to his batting intention. A degree of spin of the ball is varied depending on the batting point, and accordingly, the movement direction and the amount of rotation of the ball are varied.

The spin gage SG3 is provided in order to set the batting point (S10 and S11). The user places the batting point marked on the spin gage SG3 on a prescribed position according to his batting intention (S12). In this case, if the user moves a cursor to a prescribed position (for example, the impact zone) on the twin gage in a condition where only the twin gage is indicated, the spin gage SG3 is indicated on the position. Also, if the batting point is deviated from the spin gage SG3, the spin gage SG3 may not be indicated. In this manner, by optionally indicating the spin gage SG3 with movement of the cursor, the user can easily set the batting point and may have the sense of actual batting by the ball-shaped spin gage.

Next, the position of the impact zone IZ on the twin gage is varied according to the batting point set as described above (S13). For example, if the batting point is moved in the left direction on the basis of the center point of the ball, the impact zone IZ of the twin gage shown in FIG. 1 is moved by a specified distance to the first swing gage SG1. Or, if the batting point is moved in the right direction on the basis of the center point of the ball, the impact zone IZ of the twin gage shown in FIG. 1 is moved by a specified distance to the second swing gage SG2. Also, movement speeds of the first and second scroll bars B1 and B2 are determined according to the position of the impact zone IZ moved along the batting point (S14), and particularly, the movement speeds of the first and second scroll bars B1 and B2 are varied to make the round trip time of the first and second scroll bars B1 and B2 equal.

Next, according to a first manipulation signal from the user, the first and second scroll bars B1 and B2 on the first and second swing gages SG1 and SG2 begin to move to make a round trip from an initial position (for example, the timing point P), through the turning point T, to the timing point P of the impact zone IZ (S15 and S16). At this time, the first and second scroll bars B1 and B2 can be moved at the same speed. Under such a movement condition, when a second manipulation signal is input from the user, the positions of the first and second scroll bars B1 and B2 moving at the time of inputting of the second manipulation signal are recorded (S17 and S18). The recorded positions are called "record position" for the purpose of convenience. When the user bats the ball using the first and second scroll bars B1 and B2, a movement distance of the ball is determined according to the record position (S19). On the other hand, the first and second scroll bars B1 and B2 continue to move (for example, move to the turning point T and then turn to the initial position). At this time, the first and second scroll bars B1 and B2 move at the same speed until the record position is detected and then move at a speed optionally varied according to a speed determined according to the batting point after the record position is detected.

Thereafter, when a third manipulation is input from the user, the first and second scroll bars B1 and B2 are stopped (S20 and S21). At this time, positions at which the first and second scroll bars B1 and B2 are stopped are called "stop position". In this case, the stop positions of the first and second scroll bars B1 and B2 are detected, and the movement direction and the amount of rotation of the ball are determined according to a positional relation between the detected stop positions and the position of the impact zone (S22 and S23). Thereafter, the ball game is performed when the ball is moved by a specified distance while being rotated by a specified amount in a specified direction according to the determined movement direction and amount of rotation of the ball (S24).

Next, a detailed structure and operation of the game system according to an embodiment of the present invention will be described through an example of a case where the above-described twin gage is applied to a golf game.

FIG. 3 shows a structure of a game system according to an embodiment of the present invention. A game system 100 according to the embodiment of the present invention provides games to users through a network such as the Internet. As shown in FIG. 3, the game system 100 is connected to a plurality of user terminals (310, 320, 330, . . . , hereinafter generally referred to as "300" for the purpose of convenience) via a network 200 (including all various forms of networks such as telephone networks, the Internet, wireless communication networks, and the like).

The user terminal 300 is an information processing apparatus including or using a communication unit accessible to the game system 100 via the network 200, for example, including various communication units such as wired telephones, mobile communication terminals, computers, Internet-accessible TVs, and the like. Therefore, the user can conveniently and quickly access the game system 100 using PC communication, the Internet, wireless Internet, telephone networks, and the like.

The game system 100 connected to the user terminal 300 for providing game services to the plurality of users includes an interface server 10, a game server 20, a game database server 30, an evaluation server 40, and an authentication server 50.

The interface server 10 allows the plurality of terminals 300 to access the game system 100 via the network 200, particularly, the Internet or wireless Internet. In addition, the interface server 10 serves as a kind of WEB server or WAP server for transforming various information provided from each server 20 to 50 in compliance with a communication standard and providing the transformed information to the plurality of terminals 300, or receiving information transmitted from the terminal 300 via the network 200 and providing the received information to each server 20 to 50.

FIG. 4 shows a detailed structure of the game server 20 according to an embodiment of the present invention, and FIGS. 5 and 6 show detailed structures of the components shown in FIG. 4.

As shown in FIG. 4, the game server 20 includes a character selecting unit 21, a club selecting unit 22, a batting point determining unit 23, a gage controlling unit 24, a gage adjusting unit 25, a manipulation amount detecting unit 26, a shot processing unit 27, and a screen processing unit 28.

The character selecting unit 21 provides information on various characters provided by the system 100 to a user who requests a game and performs the game using characters selected by the user. In this case, if a power value is granted to the selected characters, this power value is set as a power value of the user. The power value is a value indicating a power of an operation of the golf game, including a movement distance (i.e., a flying distance) of a ball, swing stability, swing precision, crisis management power, and the like, without limiting to these.

The club selecting unit 22 provides several club sets provided by the system to the user and performs the game using club sets selected by the user. In the embodiment of the present invention, a specified club set is provided to the user according to a power value of the user and a requirement power value granted to each club set. The requirement power value is a power value required to use a relevant club. Accordingly, if the power value of the user satisfies a requirement power value granted to a club set selected by the user, the user is allowed to use the selected club set. Since the golf game is exemplified in this embodiment, a swing control means is called a club. However, the swing control means may be called a bat or the like depending on the kind of game.

The batting point determining unit 23 detects a batting point according to the batting intention of the user. To this end, a spin gage is provided to the user before the user shoots. The batting point determining unit 23 detects the batting intention of the user through the spin gage. That is, the batting point determining unit 23 detects the batting point set through a manipulation of the spin gage by the user and calculates a distance between the batting point projected on a virtual two-dimensional plane and the center point of the ball.

The gage controlling unit 24 determines a gage adjustment value for substantially adjusting the twin gage according to the batting intention of the user and/or an application power value granted to a club set selected by the user. Here, the gage adjustment value refers to the length of the twin gage, movement speeds of the first and second scroll bars, movement speed of the impact zone, width of the impact zone, and the like, and includes values for adjusting the shape of the twin gage according to various variables. Also, the application power value refers to a power value applied to determine movement direction or distance of the ball when the user shoots using a prescribed club.

As shown in FIG. 5, the gage controlling unit 24 includes a movement amount determining module 241 for determining the amount of movement of the impact zone according to the batting point set by the user, and a speed determining module 242 for movement speeds of the first and second scroll bars according to the batting point and/or an application power value granted to a club selected by the user. Additionally, the gage controlling unit 24 includes a length determining module 243 for determining length of the twin gage according to the application power value granted to the club selected by the user, and a width determining module 244 for determining width of the impact zone according to the application power value.

Specifically, the movement amount determining module 241 determines the amount of movement of the impact zone according to a distance between the impact zone and the center point of the ball calculated according to the batting point determined by the batting point determining unit 23. In this case, the speed determining module 242 adjusts the movement speed of the first and second scroll bars according to the determined distance differently. In addition, the speed determining module 242 first determines the movement speeds of the first and second scroll bars B1 and B2 according to a speed set by the application power value granted to the selected club and can selectively vary the determined movement speeds of the first and second scroll bars B1 and B2 according to a difference between the batting point and the center point of the ball.

The gage adjusting unit 25 generates a twin gage according to the gage adjustment value set by the gage controlling unit and varies the generated twin gage. As shown in FIG. 5, specifically, the gage adjusting unit 25 includes a movement module 251 for moving the first and second scroll bars according to the movement speeds determined by the gage controlling unit 24, a zone adjusting module 252 for adjusting a position or width of the impact zone IZ, a length adjusting module 253 for adjusting the entire length of the twin gage, a gage generating module 254 for generating the twin gage having a length according to the control of each adjusting module 252 and 253, and a display module 255 for displaying distance information on the twin gage.

The manipulation amount detecting unit 26 detects record positions and stop positions of the scroll bars of the twin gage according to a manipulation signal input from the user through the interface server 50.

The shot processing unit 27 moves the ball according to the amount of user manipulation detected by the manipulation amount detecting unit 26. As shown in FIG. 6, specifically, the shot processing unit 27 includes a flying distance determining module 271 for determining a flying distance of the ball within the maximum flying distance obtainable by the selected club according to the user manipulation (particularly, the record positions), a spin determining module 272 for determining the movement direction and amount of rotation of the ball according to a positional relation between the stop positions of the first and second scroll bars and the impact zone according to the user manipulation, and a ball movement module 273 for moving the ball along the determined flying distance while rotating the ball by the determined amount of rotation in the determined movement direction.

The screen processing unit 28 displays a movement locus of the ball moved by the shot processing unit 27. In addition, the screen processing unit 28 outputs data required for the golf game, such as reading data related to a golf course set according to a selection of the user from a background database 37 and forming the golf course and the background of a game screen, displaying the twin gage generated by the gage adjusting unit 25 on the game screen, and the like.

On the other hand, the game database server 30 provides various information required for the golf game. FIG. 7 shows a detailed structure of a game database according to an embodiment of the present invention. FIG. 7 shows representative components of the game server referring to each database and an interrelation between the databases and the game server, without limiting to the shown interrelation.

As shown in FIG. 7, the game database server 30 includes a character database 31, a club database 32, a gage database 33, an application value database 34, a grade database 35, a game progress database 36, and a background database 37.

The character database 31 stores characteristics of characters provided by the game system according to an embodiment of the present invention. Additionally, the character database 31 may store power values basically granted to the characters. For example, the character database 31 stores descriptions of characteristics of each character and values of basic power exerted by the characters. In this embodiment, the power values basically granted to the characters may be different from one another. For example, a power value of Character 1 may be set such that a flying distance is long and swing stability or swing precision is low and a power value of Character 2 may be set such that a flying distance is short and swing stability or swing precision is high. Accordingly, the user can enjoy the golf game using characters having different power values. A power value granted to a character becomes a power value of the user, and the user can increase the power value using power points.

The club database 32 stores information on clubs used in the golf game. The clubs are classified into a driver, wood, iron, pitching wedge, sand wedge, putter, and the like. A set composed of these clubs is called a club set. Also, club sets may be divided into different categories, for example, flying distance, swing stability, swing precision, crisis management power, and the like.

In addition, the club database 32 includes information on grades of club sets divided for each category and individual clubs composing a relevant club set. Additionally, the club database 32 may include requirement power values allowing use of individual clubs of the club set and application power values. In this embodiment, application power values may be differently granted to the clubs for each grade of the clubs. In this case, since the application power values increase as the grades rise, the user actively participates in the golf game in order to raise his power value so that he plays the golf game using clubs having higher grades.

The gage database 33 stores basic gage generation values used to generate the twin gage in the system. For example, the gage database 33 may store a length of a basic twin gage, an initial position of the impact zone, a width of the impact zone, start positions of the first and second scroll bars, and the like. In addition, the gage database 33 stores positional values of the impact zone according to the batting point set by the user. That is, the gage database 33 stores a movement distance of the impact zone to be moved according to a distance between the center point of the ball and the set batting point. However, the movement distance of the impact zone according to the batting point may be calculated according to a separate calculation procedure stored in a database.

The application value database 34 stores information on values substantially applied when clubs are used according to the application power values of the clubs. For example, the application value database 34 may store a flying distance application table including flying distances applied when the clubs are used, a stability application table including speeds of the swing gage and/or batting angles of the ball for each application power value, a precision application table including adjustment values of the width of the impact zone for each club for each power value, that is, zone adjustment values, and a crisis management application table including adjustment values of length of a gage (and/or additional adjustment values of the impact zone) for each application power value. Here, the speed of the swing gage is the movement speeds of the first and second scroll bars and the adjustment values of the length of a gage represent the entire length of the twin gage.

The twin gage manipulated by the user can be varied with clubs selected based on these application power values. That is, the length of the twin gage, the width of the impact zone, the movement speeds of the first and second scroll bars, and the like can be varied with the application power values.

The grade database 35 stores information on grades and power values for club selection for each user. For example, the grade database 35 stores information such as power values of characters, provided power points, grades, and the like in correspondence to character identification numbers selected by each user. The user can progress the golf game using one or more characters. A power value granted to each character becomes a power value of the user used to select a club.

The game progress database 36 stores information produced in the course of progress of the golf game. For example, the game progress database 36 stores information, such as the number of holes that the user moves, the number of strokes required in each hole, and scores, in correspondence to the character identification numbers for each user.

The background database 37 stores data related to tee, hole, green, fairway, hazards, bunkers, roughs, trees, stones, water, rocks, and the like for each golf course, which are provided in the game service according to this embodiment of the invention.

On the other hand, the evaluation server 40 checks conditions of the game progressed by the game server composed of the above-described components, calculates scores by checking the number of strokes required in each hole in the course of the game, and stores a result of the calculation in the game progress database 36. In addition, the evaluation server 40 can provide the user with power points to be used to raise a level of the user. Accordingly, the user can vary his level based on power points granted to him.

The authentication server 50 performs membership registration of a plurality of users and authentication of the users. To this end, the authentication server 50 may include a separate database storing information on users, such as passwords for login, resident registration numbers, names, post addresses, e-mail addresses, contacts (mobile telephone numbers or wired telephone numbers) and the like in correspondence to identifiers assigned to users (user IDs).

In the game system as configured above according to the embodiment of the present invention, the servers 10 to 50 are classified according to their functionalities. However, the present invention is not limited to these functionalities and may be modified in various ways.

In addition, the components of each server may be selectively included as occasion arises, and each component may be implemented as an independent server to process a relevant function. In addition, the databases 31 to 37 are not limited to the above-described classification.

Next, operation of the game system according to an embodiment of the present invention will be described based on the above-described structure.

FIGS. 8 and 9 show the entire operation of the golf game using the twin gage according to an embodiment of the present invention, and FIG. 10 shows an example of manipulation of the twin gage.

As shown in FIG. 8, first, a user who accesses the game system 100 via the network 200 may play the golf game solely or with one or more users and may select one of various kinds of games. After selecting a kind of game, the user may select a character to progress the game. In addition, the user may select one of several golf courses.

For example, after a character is selected, the character selecting unit 21 reads a power value corresponding to the selected character from the character database 31, sets the read power value as a power value of the user, stores the selected character and the power value of the user in the grade database 35 in correspondence to a user ID, and selectively informs the user of the power value. At this time, a grade of the user can be determined according to the power value of the user (S100).

Next, the user selects a club set to be used for the golf game (S110). The club selecting unit 22 provides information on several club sets provided by the system to the user, and the user selects one of the club sets based on the information. In this case, the user may select a club set having a priority of flying distance, swing stability, swing precision, or crisis management power.

When the user selects one of the club sets, the club selecting unit 22 compares a power value of a character selected by the user, that is, a user power value, with a requirement power value granted to the club set selected by the user, and provides the selected club set to the user only when the user power value exceeds the requirement power value (S120 to S140). However, this procedure may be selectively performed.

After selecting the club set as described above, when the user selects one club of the club set, the gage adjusting unit 25 displays a twin gage on a screen. Specifically, the gage adjusting unit 25 generates a twin gage based on a gage generation value from the gage database 33 and displays the generated twin gage on a screen (S150).

On the other hand, when the twin gage is generated, the gage controlling unit 24 can adjust the twin gage according to an application power value granted to the club selected by the user. The gage controlling unit 24 generates gage adjustment values by referring to the application value database 34 based on the application power value granted to the club. Specifically, the length determining module 243 determines adjustment values of length of the gage according to the application power value from the crisis management application table and provides the determined adjustment values to the gage adjusting unit 25, and the length adjusting module 253 of the gage adjusting unit 25 adjusts the length of the gage according to the provided adjustment values. In addition, the width determining module 244 determines adjustment values of the width of the impact zone according to the application power value from the precision application table and provides the determined adjustment values to the gage adjusting unit 25, and the zone adjusting module 252 of the gage adjusting unit 25 adjusts the width of the impact zone according to the provided adjustment values. In addition, the speed determining module 242 determines values of the speed of the gage according to the application power value from the stability application table and provides the determined values of the speed to the gage adjusting unit 25, and the movement module 251 of the gage adjusting unit 25 moves the first and second scroll bars B1 and B2 of the twin gage according to the provided values of speed later (S160). Such a twin gage adjustment step (S160) according to the application power value of the club may be selectively performed.

When the twin gage, having a length of the twin gage, a width of the impact zone, and the like, adjusted according to the application power value of the club selected by the user, as described above, (or the twin gage having a length of the twin gage and a width of the impact zone set in the system irrespective of the application power value of the club) is displayed on a screen as shown in (a) of FIG. 10, the user sets a batting point.

When the user is to set the batting point, the batting point determining unit 23 provides a spin gage for the setting of a batting point and determines a batting point according to a signal input through the spin gage (S170 to S190).

For example, as shown in (a) of FIG. 10, when the user places a cursor prompted on the screen onto the impact zone IZ on the twin gage using an input device, such as a mouse or a keyboard, the batting point determining unit 23 displays the spin gage SG3 on the screen as shown in (b) of FIG. 10. The spin gage SG3 has a ball-like shape such that the user can easily set a batting point of the ball, and the batting point is marked on the center of the spin gage such that the user can easily set a degree of spin of the ball. The user can have the sense of actual batting by the ball-shaped spin gage.

In order to spin the ball, as shown in (c) of FIG. 10, the user can move the batting point centered at the spin gage to a certain position by dragging the batting point using a mouse or the like. At this time, if the user moves the batting point out of the spin gage SG3, the spin gage SG3 ceases to be displayed and only the twin gage is displayed. When the user moves the batting point, the batting point determining unit 23 detects a position of the moved batting point and calculates a distance between the detected position of the batting point and the center point of the ball.

When the batting point of the ball is deviated from the center point of a virtual two-dimensional plane that coincides with the screen, that is, when the user is to spin the ball, the movement amount determining module 241 of the gage controlling unit 24 determines the amount of movement of the impact zone according to the calculated distance between the detected position of the batting point and the center point of the ball, and the zone adjusting module 252 of the gage adjusting unit 25 varies a position of the impact zone on the twin gage according to the determined amount of movement (S200). Accordingly, as shown in (c) and (d) of FIG. 10, the position of the impact zone IZ is changed according to the movement of the batting point and is displayed on the screen.

In addition, the speed determining module 242 finally determines movement speeds of the first and second scroll bars B1 and B2 (S210). For example, initial movement speeds of the first and second scroll bars B1 and B2 are selectively increased or decreased based on the position of the impact zone IZ moved according to the batting point. For example, as shown in (c) of FIG. 10, when a spin is given to the right side of the ball, and accordingly, the impact zone IZ moves to a right direction corresponding to the second swing gage SG2, a movement speed of the second scroll bar B2 is decreased, and a movement speed of the first scroll bar B1 is increased by an amount corresponding to a movement distance of the impact zone. Here, the (initial) movement speeds of the first and second scroll bars before being adjusted according to the batting point may be movement speeds set according to the application power values (swing stability and the like) of the club or movement speeds set by the system itself. The initial movement speeds of the first and second scroll bars may be equal to each other. On the other hand, when the user does not move the batting point in (b) of FIG. 10, final speeds of the first and second scroll bars B1 and B2 remain at the initial movement speeds and the impact zone is placed at the initial position.

The user may change the club to be used after the batting point is set, as described above. As shown in FIG. 10, in order to facilitate change of the club, usable clubs are displayed around the twin gage. While changing a club to be used according to a signal input through a mouse or a keyboard manipulated by the user, a selected club is displayed differently from unselected clubs such that the user can easily recognize that a particular club is selected. On the other hand, distance information related to a flying distance applied when the selected club is used may be indicated on the first swing gage SG1 and the second swing gage SG2 of the twin gage, as shown in (a) to (f) of FIG. 10.

After the batting point is determined, when a first manipulation signal is input through an input device such as a mouse or a keyboard manipulated by the user (S220), as shown in (e) of FIG. 10, the movement module 251 begins to move the first and second scroll bars B1 and B2 of the first and second swing gages SG1 and SG2 from respective start positions to the turning point T according to the speeds finally determined in consideration of the batting point (S230).

As shown in FIG. 9, when a second manipulation signal is input from the user under a condition where the first and second scroll bars B1 and B2 move at the final speeds according to the first manipulation signal (S240), the manipulation amount detecting unit 26 detects positions (record positions) of the first and second scroll bars at a point of time when the second manipulation signal is input (S250). Accordingly, the flying distance determining module 271 of the shot processing unit 27 finally determines a flying distance by which the ball is substantially moved based on the record position. For example, even if the maximum flying distance according to the application power value of the club selected by the user is 200 mm, when the user inputs the second manipulation signal at a point of 100 mm, an actually applied flying distance is determined to be 100 mm.

The first and second scroll bars B1 and B2 move to the turning point T and then turn to the start positions, as shown in (f) of FIG. 10. Next, when the user inputs a third manipulation signal, the movement module 251 stops the first and second scroll bars B1 and B2, and the manipulation amount detecting unit 26 determines stop positions of the scroll bars (S270 to S290). In addition, the spin determining module 271 of the shot processing unit 27 determines a final movement direction and a final amount of rotation of the ball according to a positional relation between the stop positions of the first and second scroll bars B1 and B2 and the impact zone (S300). Accordingly, the ball movement module 273 moves the ball by the finally determined flying distance in the finally determined movement direction.

At this time, when the first and second scroll bars B1 and B2 are stopped within the timing point P of the impact zone IZ, for example, a best shot where the ball flies and rotates in a direction according to the batting point intended by the user is attained. When the first and second scroll bars B1 and B2 are stopped at a position deviated from the timing point P, a shot where the ball flies and rotates in a direction different by a certain angle from a batting direction intended by the user depending on a degree of deviation is attained. Also, when the first and second scroll bars B1 and B2 are stopped at a position deviated from the impact zone IZ, a mishit shot is attained.

While a movement locus of the ball is displayed by the screen processing unit 25 based on such a shot, the ball stops after moving by the flying distance in the determined direction (S310).

On the other hand, although the first and second scroll bars B1 and B2 are moved at the final determined speeds from the start positions in this embodiment, the first and second scroll bars B1 and B2 may be initially moved at basically set movement speeds and then may be moved at the speeds finally determined according to the batting point after the record position is detected or from a point of time when the scroll bars turn to the start positions after passing the turning point T.

Next, the evaluation server 30 calculates scores according to a position of the ball moved according to the shot of the user and the number of strokes (S320).

The golf game continues to be performed according to the above-described method (S330 and S340). When the golf game is ended, a point providing unit 31 of the evaluation server 30 determines victory and defeat of the game according to final scores of the user (S350), and a new golf game is selectively performed (S360). The evaluation server 40 can selectively grant power points, which allow the power values to be adjusted, to the user according to a result of the game. The user can select a club dominating the percentage of victories of the golf game and play the golf game using the selected club, with his power value adjusted based on the power points granted according to the result of the game.

Although it has been described in this embodiment that application power values for varying the state of the twin gage are granted to each club used in the golf game, and that the length of the twin gage, the width of the impact zone, and the movement speeds of the scroll bars can be differently set according to these application power values, the present invention is not limited to this.

On the other hand, although it has been described in this embodiment that the game is performed using a twin gage in which the position of the impact zone is varied according to the batting point, a shape of the impact zone may be adjusted in various ways in order to set a degree of difficulty in manipulation of the twin gage in various ways.

Next, a game method according to manipulation of the twin gage according to another embodiment of the present invention will be described.

In this embodiment of the present invention, a shape of the impact zone and speeds of the first and second scroll bars are varied according to a direction in which the batting point is set on the basis of the center point of the ball and a distance between the center point of the ball and the batting point.

Similarly to the earlier embodiment, the twin gage may include the first and second swing gages SG1 and SG2, the impact zone IZ, and the spin gage SG3.

First, a structure of the impact zone IZ will be described in more detail. FIG. 11 shows a structure of the impact zone according to this embodiment of the present invention.

The impact zone IZ includes first and second batting points TP1 and TP2 arranged in the left and right sides, respectively, on the basis of the timing point P for a best shot. The first and second batting points TP1 and TP2 are segmented into a plurality of regions, and a width of each batting point TP1 and TP2 may be varied. That is, the width of the first batting point TP1 and/or second batting point TP2 of the impact zone IZ is varied according to a direction in which the batting point is set on the basis of the center point of the ball and a distance between the center point of the ball and the batting point.

If the batting point is set in the left and right sides on the basis of the center point of the ball, the position of the impact zone IZ is varied according to the distance between the center point of the ball and the batting point, as in the earlier embodiment, and, in addition, the width of the first TP1 and/or second TP2 batting points is varied according to the distance. In addition, the movement speeds of the first and second scroll bars are varied in different directions according to the distance, as in the earlier embodiment. In this case, the width of the first TP1 or second TP2 batting point may be selectively varied according to a movement direction of the batting point. For example, the width of the first point TP1 is decreased if the batting point is shifted from the center point of the ball in the left direction, while the width of the second point TP2 is decreased if the batting point is shifted from the center point of the ball in the right direction.

If the batting point is shifted in the upper and lower sides on the basis of the center point of the ball, the widths of the first and second batting points TP1 and TP2 are varied and the movement speeds of the first and second scroll bars are varied according to the distance between the center point of the ball and the batting point under a condition where the position of the impact zone IZ is fixed. For example, if the batting point is shifted from the center point of the ball in a lower or upper direction, the widths of the first and second batting points TP1 and TP2 are decreased and the movement speeds of the first and second scroll bars are increased, thereby making manipulation of the twin gage by the user difficult.

As described above, the width of the first TP1 and/or second TP2 batting points of the impact zone IZ can be varied step by step according to the direction in which the batting point is set and the distance between the center point of the ball and the batting point, and FIG. 12 shows an example of such a variation.

As shown in FIG. 12, the width of the first and second batting points TP1 and TP2 of the impact zone IZ is varied step by step. Particularly, as indicated by an arrow, the widths of the first and second batting points TP1 and TP2 are decreased as a step becomes heightened, that is, as a degree of difficulty of swing becomes heightened. For example, by constructing the batting points TP1 and TP2 of a basic impact zone IZ corresponding to Step 1 shown in FIG. 12 with a specified number (for example, five) of regions and decreasing the number of regions of the batting points TP1 and TP2 as the step becomes heightened, the width of the first and second batting points TP1 and TP2 can be adjusted. In addition, a speed of the gage, that is, speeds of the first and second scroll bars, is varied according to the width of the varied impact zone, and the speeds of the first and second scroll bars are increased as the step becomes heightened.

Accordingly, as the user desires to spin the ball more, that is, as the batting point of the ball becomes far from the center point of the ball, the width of the impact zone IZ becomes decreased and the speeds of the first and second scroll bars become fast. Thus, it becomes difficult to bat the ball according to the batting intention desired by the user.

FIG. 13 shows a flow chart of a game method according to manipulation of the twin gage according to another embodiment of the present invention, and FIGS. 14 and 15 show an example to which the game method is applied. In this embodiment, the game method will be described based on the above-described components of the system.

As described above, when the user is to bat the ball, the twin gage and the spin gage are displayed on the screen. Then, when the user moves a batting point of the spin gage SG3 to a position according to his batting intention, the batting point determining unit 23 detects a position of the moved batting point (S400 and S410). In addition, a movement direction of the batting point on the basis of the center point of the ball is determined based on the detected position (S420).

First, it is determined whether the batting point is shifted to the left and right or upper and lower sides on the basis of the center point of the ball (S430).

If the batting point is shifted to the left and right sides, a distance between the batting point and the center point of the ball is calculated, and then, the movement amount determining module 241 of the gage controlling unit 24 determines the movement amount of the impact zone according to the calculated distance. In addition, the width determining module 244 of the gage controlling unit 24 varies and determines a width of the batting point of the impact zone IZ positioned in the movement direction of the batting point according to the calculated distance (S440 to S460).

Specifically, as shown in FIG. 14, if the batting point is shifted to the left side, the amount of movement of the impact zone IZ to the left side is determined according to the distance between the batting point and the center point of the ball, and also, the width of the first batting point TP1 is decreased by a specified value according to the distance (or the amount of movement of the impact zone). For example, if the batting point is shifted by three points from the center point of the ball to the left side, the width of the first batting point TP1 is decreased by a width corresponding to the first batting point of the impact zone IZ corresponding to Step 4, higher by three steps than Step 1, in FIG. 12 according to the distance of shift of the batting point. On the other hand, if the batting point is shifted to the right side, the amount of movement of the impact zone IZ to the right side is determined according to the distance between the batting point and the center point of the ball, and also, the width of the second batting point TP2 is decreased according to the distance (or the amount of movement of the impact zone).

In this manner, the position of the impact zone IZ on the twin gage and the widths of the batting points TP1 and TP2 are determined according to the distance between the batting point and the center point of the ball, and also, the speed adjusting module 242 of the gage controlling unit 24 determines the movement speeds of the first and second scroll bars B1 and B2 according to the distance between the batting point and the center point of the ball (S470), as in the earlier embodiment.

On the other hand, if the batting pint is shifted to the upper and lower sides, the width determining module 244 of the gage controlling unit 24 varies and determines the width of the batting point of the impact zone IZ according to the distance between the batting point and the center point of the ball, under a condition where the position of the impact zone IZ is fixed (S480 to S500).

Specifically, as shown in FIG. 15, if the batting point is shifted to the lower side, the widths of the first and second batting points TP1 and TP2 are reduced by a specified value to be smaller than a reference value according to the distance. For example, if the batting point is shifted by two points from the center point of the ball to the lower side, the widths of the first and second batting points TP1 and TP2 are decreased according to the impact zone corresponding to Step 4, higher by two steps than Step 1, in FIG. 10 according to the distance of shift of the batting point. Then, the movement speeds of the first and second scroll bars B1 and B2 are increased to 3 m/s.

Under a condition where the position of the impact zone 1Z is selectively varied according to the movement direction of the batting point and the distance between the batting point and the center point of the ball, as described above, when a manipulation signal is input from the user, the movement module 251 of the gage adjusting unit 25 moves and then stops the first and second scroll bars B1 and B2 in a way similar to the earlier embodiment, the movement distance of the ball is determined according to the record position and the movement direction and the amount of rotation of the ball are determined according to the positional relation between the stop position and the position of the impact zone IZ (S510 to S530). Thereafter, the golf game is performed when the user conducts a swing by which the ball moves by a specified distance while rotating by a specified amount in a specified direction according to values determined by the shot processing unit 27 (S540). In this case, if the batting point is set in the left and right sides on the basis of the center point of the ball, the ball can be moved with more rotation according to the direction of the batting point when the ball moves and lands, and then again moves due to rebound of the ball. Alternatively, if the batting point is set in the upper and lower sides on the basis of the center point of the ball, the ball can be moved more by a specified distance than the determined movement distance when the ball lands and again moves due to rebound of the ball. In addition, when the ball lands, a backspin may be selectively applied to the ball according to a vertical movement distance of the batting point from the center point of the ball.

On the other hand, although the spin gage is used as the means for setting the batting point in the above embodiments, the present invention is not limited to this. For example, other batting point setting methods in which the user selects and sets one of various batting points provided by the system may be employed.

In addition, although the movement direction and the amount of rotation of the ball are determined according to the positional relation between the stop position of the scroll bars and the position of the impact zone in the above embodiments, the movement distance of the ball may be additionally varied according to the positional relation. That is, although the movement distance of the ball is determined according to the record position, if the stop position of the scroll bars is deviated from the impact zone, the ball may not be moved by the determined movement distance of the ball.

In addition, although the above embodiments are described based on a game method in a golf game using the twin gage according to the present invention, the present invention can be applied to all games using balls without limiting to a golf game.

In addition, although the above embodiments are described based on the game through a network, the game system and method according to the embodiments of the present invention can be applied to other off-line ball games.

In addition, the above-described game methods can be implemented in the form of a program stored in a computer-readable recording medium. The computer-readable recording medium may include all kinds of recording media in which data that can be read by a computer are stored, for example, CD-ROMs, magnetic tapes, floppy disks, carrier wave (for example, transmission via the Internet), and the like.

Although the most practical and preferred embodiments of the present invention have been described in detail, it is obvious to those skilled in the art that the present invention is not restricted in the embodiments and may be modified or changed in various forms without deviating from the spirit and scope of the invention as set forth in the annexed claims and equivalents thereof.

As used in this application, the term "module" or "unit" is intended to refer to, but is not limited to a software or hardware component, which performs certain tasks. A module or unit may advantageously be configured to reside on the addressable storage medium and configured to execute on one or more processors. Thus, a module or unit may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the units and modules may be combined into fewer units and modules or further separated into additional units and modules. Thus, there has been shown and described several embodiments of a novel invention. As is evident from the foregoing description, certain aspects of the present invention are not limited by the particular details of the examples illustrated herein and it is therefore contemplated that other modifications and applications, or equivalents thereof, will occur to those skilled in the art. The terms "having" and "including"

and similar terms as used in the foregoing specification are used in the sense of "optional" or "may include" and not as "required". Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow. The scope of the disclosure is not intended to be limited to the embodiments shown herein, but is to be accorded the full scope consistent with the claims wherein reference to an element in the singular is not intended to mean "one and only one" unless specifically so stated, but rather "one or more." All structural and functional equivalents to the elements of the various embodiments described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. Section 112, sixth paragraph, unless the element is expressly recited using the phrase "means for" or, in the case of a method claim, the element is recited using the phrase "step for."

INDUSTRIAL APPLICABILITY

As apparent from the above description, according to the embodiments of the present invention, the degree of difficulty of manipulation for swing is varied according to the batting intention of the user. Particularly, by constructing two swing gages in the form of a twin gage and varying the position of the impact zone placed between the two swing gages according to the batting intention of the user, gage manipulation is varied when the user desires to spin the ball and according to the degree of spin.

In addition, since the width of the impact zone and the movement speeds of the scroll bars are varied according to the batting intention of the user, and particularly, the width of the impact zone becomes decreased and the movement speeds of the scroll bars becomes fast as the degree of difficulty of batting becomes increased, it becomes difficult to manipulate the twin gage.

As a result, a degree of difficulty of manipulation of the twin gage is varied according to the batting intention of the user, thereby making ball games more interesting, which may result in more active participation of users in ball games.

What is claimed is:

1. A method for a video game that utilizes a processor for simulating a ball game whereby a user hits a ball, the method comprising:
   a) providing a twin gage displayed on a video screen to a user for selecting input values for range and impact zone, said twin gage having a first swing gage with a first scroll bar movable on the first swing gage and a second swing gage with a second scroll bar movable on the second swing gage, said range value being selected on at least one of the swing gages with a respective said scroll bar, said impact zone being used for determining a direction of movement and a spin amount of a hit ball;
   b) determining, using the processor, a batting point of the ball according to the user's input; and
   c) changing the position of the impact zone of the twin gage according to the determined batting point, the direction of movement and the spin amount of the hit ball being determined according to a positional relation between the first and second scroll bars and the impact zone; and
   d) moving the first and second scroll bars at respective speeds in response to a user input and changing the respective speeds according to the determined batting point such that a round trip time of the first scroll bar from said impact zone to a turning end of the first swing gage is equal to a round trip time of the second scroll bar from said impact zone to a turning end of the second swing gage.

2. The method of claim 1, wherein the impact zone includes a timing point for a best swing and first and second batting points, which are arranged on the basis of the timing point; the method further comprising:
   determining the direction of movement of the hit ball based upon the positional relationship between the batting point and a center position of the ball; and
   selectively changing widths of the first and second batting points of the impact zone according to the determined direction and distance, the direction of movement and the spin amount of the hit ball being determined according to a positional relation between the first and second scroll bars.

3. The method of claim 2, wherein, if the batting point of the ball is positioned in a first direction on the basis of the center point of the ball, determining the direction of movement of the hit ball based upon the positional relationship between the batting point and a center position of the ball comprises:
   decreasing a width of a batting point, which is positioned in the first direction, of the first and second batting points of the impact zone; and
   moving the position of the impact zone in the first direction according to the determined distance.

4. The method of claim 2, wherein, if the batting point of the ball is positioned in a second direction on the basis of the center point of the ball, selectively changing widths of the first and second batting points of the impact zone comprises decreasing widths of the first and second batting points of the impact zone according to the determined distance.

5. The method of claim 1, wherein, when the position of the impact zone is changed, the impact zone is moved from an initial position in a direction in which the determined batting point is positioned on the basis of the center point of the ball in proportion to a distance between the center point and the batting point of the ball.

6. The method of claim 1, wherein a movement speed of a scroll bar of a swing gage positioned in a movement direction of the impact zone is decreased, and a movement speed of a scroll bar of a swing gage positioned in a direction opposite to the movement direction of the impact zone is increased.

7. The method of claim 1, wherein the amount of increase and decrease of the movement speeds of the scroll bars is varied according to the amount of movement of the impact zone.

8. The method of claim 1, wherein b) comprises:
   providing the user with a spin gage for selecting the input value for batting point of the ball; and
   determining a position of the batting point according to the user's input for the spin gage.

9. The method of claim 1, wherein, when the user manipulates the twin gage, after moving and then stopping the first and second scroll bars at respective movement speeds determined according to the batting point, the movement direction and the amount of rotation of the ball are determined based on a positional relation between stop positions of the first and second scroll bars and a position of the impact zone.

10. The method of claim 1, wherein an application power value applied when a relevant club is used is granted to each club to be used, the application value being a value for adjusting a shape of the twin gage and the movement speeds of the first and second scroll bars.

11. A method for a video game that utilizes a processor for simulating a ball game whereby a user hits a ball, the method comprising:
   a) providing a swing control means displayed on a video screen to a user for selecting input values for distance and a direction of movement of a hit ball;
   b) providing a spin gage on the video screen for determining a batting point of the hit ball; and
   c) determining, using the processor, the batting point according to the manipulation of the spin gage; and
   d) moving the hit ball in a direction according to the determined batting point when the swing control means is manipulated by user,
   wherein the swing control means comprises a twin gage including first and second swing gages arranged on the basis of an impact zone for determining a batting direction of the ball, first and second scroll bars being movable on the first and second swing gages, respectively, and a position of the impact zone is varied according to the determined batting point,
   and wherein the first and second scroll bars move at respective speeds in response to a user input and the movement speeds of the first and second scroll bars are changed according to the determined batting point such that a round trip time of the first scroll bar from the impact zone to a turning end of the first swing gage is equal to a round trip time of the second scroll bar from the impact zone to a turning end of the second swing gage.

12. The method of claim 11, wherein b) further comprises indicating the spin gage when the user selects the swing control means.

13. The method of claim 11, wherein the spin gage displayed on the video screen has a ball-like shape and the batting point is marked within the spin gage.

14. The method of claim 11, wherein the spin gage that has a ball-like shape and includes the batting point is indicated when the user moves a cursor to the swing control means displayed on a screen, and the indication of the spin gage is stopped and only the swing control means is indicated when the user moves the cursor out of the spin gage in manipulating the batting point of the spin gage.

15. The method of claim 11, wherein d) comprises moving the hit ball in a movement direction and with an amount of rotation of the ball when the user manipulates the twin gage, the movement direction and the amount of rotation of the ball being determined according to a positional relation between the first and second scroll bars and the impact zone.

16. One or more non-transitory computer-readable storage media having stored thereon a computer program that, when executed by one or more processors, causes the one or more processors to perform acts including:
   providing a twin gage displayed on a video screen to a user for selecting input values for range and impact zone, said twin gage having a first swing gage with a first scroll bar movable on the first swing gage and a second swing gage with a second scroll bar movable on the second swing gage, said range value being selected on at least one of the swing gages with a respective said scroll bar, said impact zone being used for determining a direction of movement and a spin amount of a hit ball;
   determining a batting point of the ball according to the user's input;
   changing the position of the impact zone of the twin gage according to the determined batting point, the direction of movement and the spin amount of the hit ball being determined according to a positional relation between the first and second scroll bars and said impact zone; and
   moving the first and second scroll bars at respective speeds in response to a user input and changing the respective speeds of the first and second scroll bars according to the determined batting point such that a round trip time of the first scroll bar from said impact zone to a turning end of the first swing gage is equal to a round trip time of the second scroll bar from said impact zone to a turning end of the second swing gage.

17. A system for a video game for simulating a ball game whereby a user hits a ball, the system comprising:
   a gage adjusting unit, the gage adjusting unit providing a twin gage displayed on a video screen to a user for selecting input values for range and impact zone, said twin gage having a first swing gage with a first scroll bar movable on the first swing gage and a second swing gage with a second scroll bar movable on the second swing gage, said range value being selected on at least one of the swing gages with a respective said scroll bar, said impact zone being used for determining a direction of movement and a spin amount of a hit ball;
   a batting point detecting unit, the batting point detecting unit detecting a batting point of the ball according to the user's input;
   a gage controlling unit, the gage controlling unit determining a position of the impact zone of the twin gage and movement speeds of the first and second scroll bars according to the detected batting point; and
   a shot processing unit, the shot processing unit moving the ball in a movement direction and with a spin amount of the ball, wherein the movement direction and the spin amount of the ball are determined according to a positional relation between the first and second scroll bars and the impact zone,
   wherein the gage controlling unit moves the first and second scroll bars at respective speeds in response to a user input and changes the respective movement speeds of the first and second scroll bars according to the detected batting point such that a round trip time of the first scroll bar from said impact zone to a turning end of the first swing gage is equal to a round trip time of the second scroll bar from said impact zone to a turning end of the second swing gage.

18. The system of claim 17, wherein the gage adjusting unit includes:
   a gage generating module, the gage generating module generating the twin gage;
   a movement module, the movement module moving or stopping the first and second scroll bars of the twin gage at the movement speeds determined by the gage controlling unit according to manipulation of the user; and
   a zone adjusting module, the zone adjusting module varying the position of the impact zone of the twin gage according to the position determined by the gage controlling unit.

19. The system of claim 17, further comprising:
   a manipulation amount detecting unit for, when the first and second scroll bars are moved according to a first manipulation signal input from the user, detecting first positions of the first and second scroll bars at a point of time when a second manipulation signal is input from the user and detecting second positions at which the first and second scroll bars are stopped when a third manipulation signal is input from the user.

20. The system of claim 17, wherein the shot processing unit includes:

a distance determining module, the distance determining module determining a distance of the hit ball according to the first positions of the first and second scroll bars; and a spin determining module, the spin determining module determining a movement direction and a spin amount of the ball according to a positional relation between the second positions of the first and second scroll bars and the position of the impact zone.

21. The system of claim 17, wherein the batting point detecting unit provides a spin gage displayed on the video screen for allowing the user to select the input value for batting point of the ball for determining the spinning amount for the hit ball.

22. One or more non-transitory computer-readable storage media having stored thereon a computer program that, when executed by one or more processors, causes the one or more processors to perform acts comprising:

a) providing a swing control means displayed on a video screen to a user for selecting input values for distance and a direction of movement of a hit ball;
b) providing a spin gage on the video screen for determining a batting point of the hit ball;
c) determining the batting point according to the manipulation of the spin gage; and
d) moving the hit ball in a direction according to the determined batting point when the swing control means is manipulated by user, wherein the swing control means comprises a twin gage including first and second swing gages arranged on the basis of an impact zone for determining a batting direction of the ball, first and second scroll bars being movable on the first and second swing gages, respectively, and a position of the impact zone is varied according to the determined batting point, and wherein the first and second scroll bars move at respective speeds in response to a user input and the movement speeds of the first and second scroll bars are changed according to the determined batting point such that a round trip time of the first scroll bar from the impact zone to a turning end of the first swing gage is equal to a round trip time of the second scroll bar from the impact zone to a turning end of the second swing gage.

* * * * *